(12) United States Patent
Ryu et al.

(10) Patent No.: US 9,086,531 B2
(45) Date of Patent: Jul. 21, 2015

(54) PLASTIC POLARIZED LENS, METHOD FOR PRODUCING THE SAME, AND POLARIZED FILM

(75) Inventors: Akinori Ryu, Arao (JP); Seiichi Kobayashi, Yokohama (JP); Hiroyuki Kamio, Ichinomiya (JP); Yoshiharu Kobayashi, Nagoya (JP); Mitsuru Sakai, Kisarazu (JP); Yoshimitsu Aiiso, Fukui (JP)

(73) Assignee: MITSUI CHEMICALS, INC., Tokyo (JP)

( * ) Notice: Subject to any disclaimer, the term of this patent is extended or adjusted under 35 U.S.C. 154(b) by 148 days.

(21) Appl. No.: 13/813,312
(22) PCT Filed: Aug. 10, 2011
(86) PCT No.: PCT/JP2011/004544
§ 371 (c)(1), (2), (4) Date: Jan. 30, 2013
(87) PCT Pub. No.: WO2012/020570
PCT Pub. Date: Feb. 16, 2012

(65) Prior Publication Data
US 2013/0155507 A1 Jun. 20, 2013

(30) Foreign Application Priority Data
Aug. 12, 2010 (JP) .................................. 2010-180732

(51) Int. Cl.
*G02B 1/08* (2006.01)
*B29D 11/00* (2006.01)
(Continued)

(52) U.S. Cl.
CPC . *G02B 1/08* (2013.01); *B29C 33/10* (2013.01); *B29C 39/10* (2013.01); *B29C 39/12* (2013.01); (Continued)

(58) Field of Classification Search
CPC ........ G02B 1/041; G02B 1/08; G02B 5/3033; G02B 2207/113; C09B 47/00; B29C 39/10; B29C 39/12; B29C 33/10; C08L 81/00; C08L 75/04; B29K 2075/00; B29K 2995/0034; G02C 7/08; G02C 7/12; G02C 7/022; G02C 2202/16

USPC .................... 359/487.02, 642; 264/1.32, 1.34
See application file for complete search history.

(56) References Cited

U.S. PATENT DOCUMENTS

| | | | |
|---|---|---|---|
| 2005/0046321 A1 * | 3/2005 | Suga et al. | .................... 313/112 |
| 2009/0256141 A1 | 10/2009 | Thompson et al. | |
| 2012/0138877 A1 | 6/2012 | Mizukawa et al. | |

FOREIGN PATENT DOCUMENTS

EP 2051129 A1 * 4/2009
(Continued)

OTHER PUBLICATIONS

Office Action dated Nov. 12, 2013, issued by the Chinese Patent Office in the corresponding Chinese Patent Application No. 201180039469.0. (15 pages).
(Continued)

*Primary Examiner* — Thao T Tran
(74) *Attorney, Agent, or Firm* — Buchanan, Ingersoll & Rooney PC

(57) ABSTRACT

The plastic polarized lens (10) of the present invention contains a polarized film (12) and layers (resin layers) (14a and 14b) comprising a thiourethane-based resin stacked over both surfaces of the polarized film (12), and the polarized film contains an organic coloring compound represented by the following general formula (1).

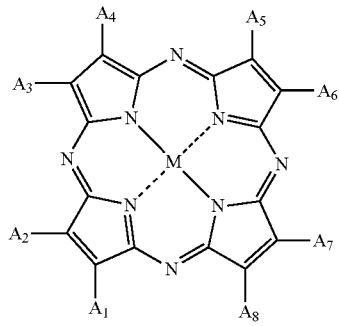

(1)

37 Claims, 2 Drawing Sheets

(51) Int. Cl.
  *C09B 47/00* (2006.01)
  *G02B 1/04* (2006.01)
  *G02B 5/30* (2006.01)
  *B29C 39/10* (2006.01)
  *B29C 39/12* (2006.01)
  *B29C 33/10* (2006.01)
  *B29K 75/00* (2006.01)

(52) U.S. Cl.
  CPC ............... *C09B 47/00* (2013.01); *G02B 1/041* (2013.01); *G02B 5/3033* (2013.01); *B29K 2075/00* (2013.01); *B29K 2995/0034* (2013.01); *G02B 2207/113* (2013.01)

(56) References Cited

FOREIGN PATENT DOCUMENTS

| | | |
|---|---|---|
| JP | 61-087757 A | 5/1986 |
| JP | 5-5860 A | 1/1993 |
| JP | 5-45610 A | 2/1993 |
| JP | 9-258009 A | 10/1997 |
| JP | 2001-249227 A | 9/2001 |
| JP | 2002-267841 A | 9/2002 |
| JP | 2008-134618 A1 | 6/2008 |
| JP | 2008-268331 A | 11/2008 |
| WO | WO 96/00247 A1 | 1/1996 |
| WO | WO 02/073291 A1 | 9/2002 |
| WO | WO 2004/099859 A1 | 11/2004 |
| WO | WO 2009/098886 A1 | 8/2009 |

OTHER PUBLICATIONS

Office Action issued on May 20, 2014, by the Japanese Patent Office in corresponding Japanese Patent Application No. 2012-528596. (2 pages).

International Search Report (PCT/ISA/210) issued on Sep. 20, 2011, by the Japanese Patent Office as the International Searching Authority for International Application No. PCT/JP2011/004544.

* cited by examiner

PLASTIC POLARIZED LENS, METHOD FOR PRODUCING THE SAME, AND POLARIZED FILM

TECHNICAL FIELD

The present invention relates to a plastic polarized lens, a method for producing the same, and a polarized film.

BACKGROUND ART

A polarized lens can prevent transmission of reflected light. Therefore, it is used for, for example, protecting eyes by intercepting strong reflected light outdoors such as on a skiing area or in fishing, and for securing safety during driving a car by intercepting reflected light from a car traveling in the opposite direction.

For a plastic polarized lens, two kinds of polarized lens, that is, a polarized lens with a polarized film laid on the surface of the plastic lens material, and a sandwich structured polarized lens with a polarized film within the plastic lens material, have been proposed. The polarized lens with a polarized film laid on the surface of the plastic lens material (for example, Japanese Patent Laid-Open Application No. 09-258009 (Patent Document 1)) can make the thickness of the lens smaller, but has a serious disadvantage that the polarized film is liable to be peeled off from the lens material during a periphery polishing process (a process of polishing the edges of the lens to match a predetermined shape).

A resin used for a polarized film constituting a polarized lens has been hitherto essentially limited to polyvinyl alcohols. The polarized film is produced by uniaxial stretching of a polyvinyl alcohol film after adding iodine or a dichroic dye to make a film having molecular orientation in a uniaxial direction. A method of producing a polarized lens composed of a polarized polyvinyl alcohol film is disclosed, for example, in the pamphlet of WO 04/099859 (Patent Document 2).

However, a polarized lens prepared using a polarized polyvinyl alcohol film has a disadvantage of gradual invasion of moisture from the edge of the lens, or due to the environment from the peripheral portion of the lens toward the central portion and thus, deterioration develops over time.

In order to improve the above-described disadvantages, the pamphlet of WO 02/073291 (Patent Document 3) has proposed a polarized lens using a lens material including an impact-resistant polyurethane resin obtained from a diamine and an isocyanate prepolymer, and a polarized polyethylene terephthalate film.

However, this polarized lens has a disadvantage that the polarized film contained in the lens is clearly visible from outside, which gives an uncomfortable feeling to a person who wears the eyeglasses containing this lens. In addition, since a composition formed by mixing a diamine and an isocyanate prepolymer has a high viscosity as well as a short pot life, injection of the composition into a lens casting mold having a fixed polarized film therein is troublesome, and the production of a thin lens has been extremely difficult.

Therefore, in the plastic polarized lenses in the related art, there has been a demand for a plastic polarized lens, which has suppressed occurrence of the peeling-off of the polarized film during a downstream process of polishing the periphery of the lens, excellent water resistance, and suppressed uncomfortable feeling during wearing, and is capable of producing a thin product or the like.

On the other hand, it is desired to improve the contrast of an object to be viewed through the lens, in order to clarify the outlines and the colors of an object, and thus reduce visual fatigue regarding spectacle lenses. In order to improve the contrast, it is necessary to selectively shield (or cut) as far as possible a wavelength band which easily gives glare. For example, it is known that a neodymium compound can absorb visible light in the vicinity of 585 nm with high selectivity, and a spectacle lens including the neodymium compound improves the contrast. Improvement of the contrast of the object by a rare earth metal compound such as a neodymium compound is attributable to extremely sharp peak shapes of the absorption spectrum in the absorption wavelength band in the visible light region, that is, the absorption wavelength range is narrow and the wavelength selectivity is high. By such high wavelength selectivity, effects of a high transmission in a wavelength band requiring visibility and the wavelength band adversely affecting the glare being selectively absorbed can be obtained. Thus, by using a rare earth metal compound such as a neodymium compound, the contrast is improved, and thus, it is possible to obtain a spectacle lens having excellent visibility.

Furthermore, in addition to the rare earth metal compound such as typically a neodymium compound, it is also known that a specific organic coloring agent improves the contrast property of a spectacle lens. Examples of such organic coloring agents include a tetraazaporphyrin compound. The tetraazaporphyrin compound can provide excellent anti-glare performance and improvement of a contrast property for the spectacle lens, in a similar manner to the neodymium compound. That is, since a bright view field can be ensured with good light transmittance in the area excepting that of around 585 nm, derived from the sharpness of the peaks in the specific absorption wavelength, spectacle lenses having an extremely high balance of antiglare properties and visibility (contrast property) can be provided. In the case of using the organic coloring agent, a method in which an organic coloring agent is dissolved in a monomer composition in advance, followed by performing polymerization to obtain a lens is described in Examples of Japanese Patent Laid-Open Application No. 2008-134618 (Patent Document 4). Further, a plastic lens obtained by polymerizing a monomer composition having an organic coloring agent dissolved therein is disclosed in Examples of Patent Document 4, and a plastic lens obtained by laminating a base layer including the monomer composition on a polarized film is not specifically disclosed therein.

In Patent Document 4, an organic coloring compound that improves a contrast property is directly dissolved in a monomer composition and polymerized to form lens materials. Thus, according to the type of the monomers, particularly, there may be cases where the functions of the organic coloring compound are damaged due to the interaction with the monomers or the reactions during a polymerization reaction. Further, there are cases where for lenses for vision correction, there is a large difference in the thickness between the central portion and the peripheral portion, and in the case where the organic coloring compound is incorporated in the lens material itself, there have been cases where the color intensity in the central portion and the peripheral portion varies due to the coloration derived from the organic coloring compound. As it is used for vision correction of the intensity, the difference in the thickness between the central portion and the peripheral portion increases, and accordingly, such a tendency gets more remarkable. In this way, a polarized lens having a partially different thickness has changed in the color intensity in the portion, and accordingly, it has room for improvement in appearance. For example, in Examples of Patent Document 4, an organic coloring agent is directly dissolved in a monomer composition, and further, all of the lenses prepared in Examples are a Plano lens (a lens having a small difference in the thickness between the central portion and the peripheral portion). Accordingly, there is a desire for development of a lens having an improved contrast property, which can correspond to the lenses for vision correction.

RELATED DOCUMENTS

Patent Documents

[Patent Document 1] Japanese Patent Laid-Open Application No. 09-258009
[Patent Document 2] Pamphlet of International Publication WO 04/099859
[Patent Document 3] Pamphlet of International Publication WO 02/073291
[Patent Document 4] Japanese Patent Laid-Open Application No. 2008-134618
[Patent Document 5] Pamphlet of International Publication WO 96/00247
[Patent Document 6] Japanese Patent Laid-Open Application No. 05-5860
[Patent Document 7] Japanese Patent Laid-Open Application No. 05-45610

DISCLOSURE OF THE INVENTION

The present invention has been made by taking the above problems in the related art into consideration, and provides a plastic polarized lens with an improved contrast property and excellent appearance, water resistance, processability, or the like, and a method of producing the same. In addition, the present invention provides a polarized film having a polarizing function provided therewith and capable of providing a high contrast property.

That is, the present invention will be described below.
(1) A plastic polarized lens comprising:
a polarized film and
layers comprising a thiourethane-based resin stacked over both surfaces of the polarized film,
wherein the polarized filed contains an organic coloring compound represented by the following general formula (1):

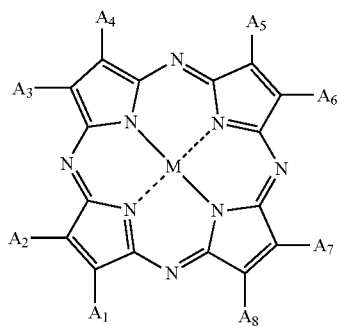

(1)

In the formula (1), $A_1$ to $A_8$ each independently represent a hydrogen atom, a halogen atom, a nitro group, a cyano group, a hydroxy group, an amino group, a carboxyl group, a sulfone group, a linear, branched, or cyclic alkyl group having 1 to 20 carbon atoms, an alkoxy group having 1 to 20 carbon atoms, an aryloxy group having 6 to 20 carbon atoms, a monoalkylamino group having 1 to 20 carbon atoms, a dialkylamino group having 2 to 20 carbon atoms, an aralkyl group having 7 to 20 carbon atoms, an aryl group having 6 to 20 carbon atoms, a heteroaryl group, an alkylthio group having 1 to 20 carbon atoms, or an arylthio group having 1 to 20 carbon atoms, or may form a ring other than an aromatic ring through a linking group, and M represents two hydrogen atoms, a divalent metal atom, a trivalent mono-substituted metal atom, a tetravalent di-substituted metal atom, or an oxy metal.

(2) The plastic polarized lens as described in (1) as above, wherein the organic coloring compound is represented by the following general formula (1a):

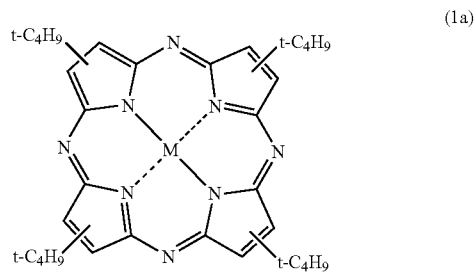

(1a)

In the formula (1a), $t-C_4H_9$ represents a tertiary butyl group. Four tertiary butyl groups correspond to $A_1$ or $A_2$, $A_3$ or $A_4$, $A_5$ or $A_6$, and $A_7$ or $A_8$, respectively, in the formula (1), and represent a position isomer structure. Further, four groups that are not tertiary butyl groups in $A_1$ to $A_8$ represent a hydrogen atom. M represents a divalent copper atom, a divalent palladium atom, or divalent vanadium oxide (—V(=O)—).

(3) The plastic polarized lens as described in (1) or (2) as above, wherein the polarized film is comprised of a thermoplastic polyester.

(4) The plastic polarized lens as described in any one of (1) to (3) as above, wherein the organic coloring compound is contained in an amount of 50 to 7000 ppm in the polarized film.

(5) The plastic polarized lens as described in any one of (1) to (4) as above, wherein the thiourethane-based resin is obtained by reacting (A) at least one kind of isocyanate compounds selected from the group consisting of a polyisocyanate compound, an isocyanate compound having an isothiocyanate group, and a polyisothiocyanate compound with (B) at least one kind of active hydrogen compounds selected from the group consisting of thiol compounds and polythiol compounds having a hydroxy group.

(6) The plastic polarized lens as described in any one of (3) to (5) as above, wherein the polarized film is formed under the condition of the temperature Ti represented by the following formula:

Glass transition temperature of the thermoplastic polyester+20° C.≤$T1$≤Glass transition temperature of the thermoplastic polyester+120° C.

(7) The plastic polarized lens as described in any one of (1) to (6) as above, wherein the formation or surface modification treatment of the adhesive layer is carried over at least one surface of the polarized film.

(8) The plastic polarized lens as described in any one of (3) to (7) as above, wherein the thermoplastic polyester is a polyethylene terephthalate.

(9) The plastic polarized lens as described in any one of (5) to (8) as above, wherein the isocyanate compound (A) is a diisocyanate compound and the active hydrogen compound (B) is a polythiol compound.

(10) The plastic polarized lens as described in anyone of (5) to (9) as above, wherein the isocyanate compound (A) is at least one kind of diisocyanate compound selected from the group consisting of 2,5-bis(isocyanatomethyl)bicyclo-[2.2.1]-heptane, 2,6-bis(isocyanatomethyl)bicyclo-[2.2.1]-heptane, and m-xylylene diisocyanate, and the active hydrogen compound (B) is at least one kind of polythiol compound selected from the group consisting of pentaerythritoltetrakis(3-mercaptopropionate), 4-mercaptomethyl-1,8-dimercapto-3,6-dithiaoctane, 5,7-dimercaptomethyl-1,1'-dimercapto-3,6,9-trithiaundecane, 4,7-dimercaptomethyl-1,1'-dimercapto-3,6,9-trithiaundecane, and 4,8-dimercaptomethyl-1,1'-dimercapto-3,6,9-trithiaundecane.

(11) The plastic polarized lens as described in any one of (1) to (10) as above, wherein the refractive index at e-line of the thiourethane-based resin is in a range of 1.57 to 1.70.

(12) The plastic polarized lens as described in anyone of (1) to (10) as above, wherein the refractive index at e-line of the thiourethane-based resin is in a range of 1.59 to 1.70.

(13) A method of producing a plastic polarized lens, including:

producing a resin film containing an organic coloring compound represented by the following general formula (1), shaping the resin film to obtain a polarized film, fixing the polarized film in a lens casting mold in a state in which the polarized film is apart from the mold, injecting a monomer mixture into the space between both surfaces of the polarized film and the mold, and stacking layers comprising a thiourethane-based resin over both surfaces of the polarized film by polymerizing and curing the monomer mixture.

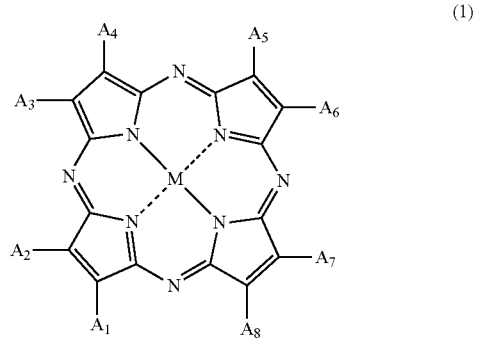

(1)

In the formula (1), $A_1$ to $A_8$ each independently represent a hydrogen atom, a halogen atom, a nitro group, a cyano group, a hydroxy group, an amino group, a carboxyl group, a sulfone group, a linear, branched, or cyclic alkyl group having 1 to 20 carbon atoms, an alkoxy group having 1 to 20 carbon atoms, an aryloxy group having 6 to 20 carbon atoms, a monoalkylamino group having 1 to 20 carbon atoms, a dialkylamino group having 2 to 20 carbon atoms, an aralkyl group having 7 to 20 carbon atoms, an aryl group having 6 to 20 carbon atoms, a heteroaryl group, an alkylthio group having 1 to 20 carbon atoms, or an arylthio group having 1 to 20 carbon atoms, or may form a ring other than an aromatic ring through a linking group, and M represents two hydrogen atoms, a divalent metal atom, a trivalent mono-substituted metal atom, a tetravalent di-substituted metal atom, or an oxy metal).

(14) The method of producing a plastic polarized lens as described in (13) as above, wherein the organic coloring compound is represented by the following general formula (1a):

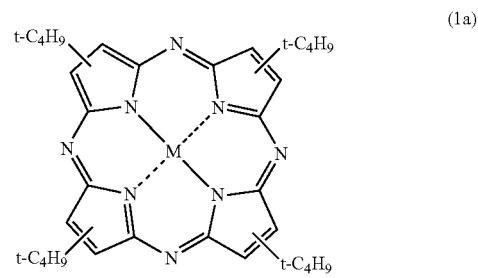

(1a)

In the formula (1a), $t-C_4H_9$ represents a tertiary butyl group. Four tertiary butyl groups correspond to $A_1$ or $A_2$, $A_3$ or $A_4$, $A_5$ or $A_6$, and $A_7$ or $A_8$, respectively, in the formula (1), and represent a position isomer structure. Further, four groups that are not tertiary butyl groups in $A_1$ to $A_8$ represent a hydrogen atom. M represents a divalent copper atom, a divalent palladium atom, or divalent vanadium oxide (—V(=O)—).

(15) The method of producing a plastic polarized lens as described in (13) or (14) as above, wherein the resin film is a thermoplastic polyester film.

(16) The method of producing a plastic polarized lens as described in (15) as above, wherein the shaping the resin film includes:

shaping the thermoplastic polyester film under the temperature condition of the glass transition temperature of the thermoplastic polyester+20° C. or higher and the glass transition temperature+120° C. or lower.

(17) The method of producing a plastic polarized lens as described in any one of (13) to (16) as above, wherein the monomer mixture includes:

(A) at least one kind of isocyanate compounds selected from the group consisting of a polyisocyanate compound, an isocyanate compound having an isothiocyanate group, and a polyisothiocyanate compound, (B) at least one kind of active hydrogen compound selected from the group consisting of thiol compounds and polythiol compounds having a hydroxy group.

(18) The method of producing a plastic polarized lens as described in any one of (13) to (17) as above, further including:

subjecting at least one surface of the polarized film to a surface modification treatment before the fixing the polarized film.

(19) The method of producing a plastic polarized lens as described in any one of (13) to (18) as above, further including:

forming an adhesive layer over at least one surface of the polarized film before the step of fixing the polarized film.

(20) The method of producing a plastic polarized lens as described in any one of (13) to (18), further including:

subjecting at least one surface of the polarized film to a surface modification treatment; and forming an adhesive layer over the surface that has been subjected to a surface modification treatment, before the fixing the polarized film.

(21) The method of producing a plastic polarized lens as described in any one of (15) to (20) as above, wherein the thermoplastic polyester is a polyethylene terephthalate.

(22) The method of producing a plastic polarized lens as described in any one of (17) to (21) as above, wherein the isocyanate compound (A) is a diisocyanate compound and the active hydrogen compound (B) is a polythiol compound.

(23) The method of producing a plastic polarized lens as described in any one of (17) to (22) as above, wherein the isocyanate compound (A) is at least one kind of diisocyanate compounds selected from the group consisting of 2,5-bis(isocyanatomethyl)bicyclo-[2.2.1]-heptane, 2,6-bis(isocyanatomethyl)bicyclo-[2.2.1]-heptane, and m-xylylene diisocyanate, and the active hydrogen compound (B) is at least one kind of polythiol compounds selected from the group consisting of pentaerythritoltetrakis(3-mercaptopropionate), 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,1'-dimercapto-3,6,9-trithiaundecane.

(24) The method of producing a plastic polarized lens as described in any one of (13) to (23) as above, wherein the viscosity at 20° C. of the monomer mixture is 200 mPa·s or less in the injecting step.

(25) A polarized film including a resin containing an organic coloring compound represented by the following general formula (1):

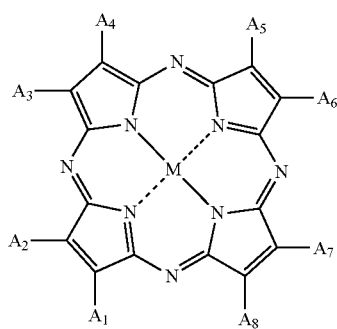
(1)

In the formula (1), $A_1$ to $A_8$ each independently represent a hydrogen atom, a halogen atom, a nitro group, a cyano group, a hydroxy group, an amino group, a carboxyl group, a sulfone group, a linear, branched, or cyclic alkyl group having 1 to 20 carbon atoms, an alkoxy group having 1 to 20 carbon atoms, an aryloxy group having 6 to 20 carbon atoms, a monoalkylamino group having 1 to 20 carbon atoms, a dialkylamino group having 2 to 20 carbon atoms, an aralkyl group having 7 to 20 carbon atoms, an aryl group having 6 to 20 carbon atoms, a heteroaryl group, an alkylthio group having 1 to 20 carbon atoms, or an arylthio group having 1 to 20 carbon atoms, or may form a ring other than an aromatic ring through a linking group, and M represents two hydrogen atoms, a divalent metal atom, a trivalent mono-substituted metal atom, a tetravalent di-substituted metal atom, or an oxy metal.

(26) The polarized film as described in (25) as above, wherein the organic coloring compound is represented by the following general formula (1a):

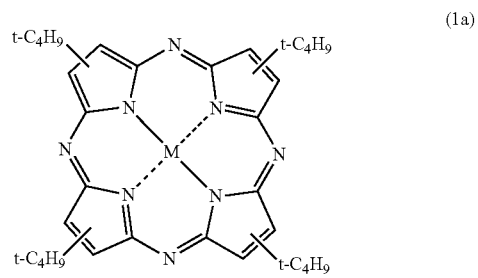
(1a)

In the formula (1a), t-$C_4H_9$ represents a tertiary butyl group. Four tertiary butyl groups correspond to $A_1$ or $A_2$, $A_3$ or $A_4$, $A_5$ or $A_6$, and $A_7$ or $A_8$, respectively, in the formula (1), and represent a position isomer structure. Further, four groups that are not tertiary butyl groups in $A_1$ to $A_8$ represent a hydrogen atom. M represents a divalent copper atom, a divalent palladium atom, or divalent vanadium oxide (—V(=O)—).

(27) The polarized film as described in (25) or (26) as above, wherein the resin is a thermoplastic polyester.

(28) The polarized film as described in any one of (25) to (27) as above, wherein the organic coloring compound is contained in the amount of 50 to 7000 ppm in the polarized film.

(29) The polarized film as described in (27) or (28) as above, wherein the thermoplastic polyester is a polyethylene terephthalate.

(30) The polarized film as described in any one of (25) to (29) as above, which is used in a plastic polarized lens having layers including a thiourethane-based resin laminated over both surfaces of the polarized film.

(31) A method for producing the polarized film as described in (30) as above, including:
producing a resin film containing the organic coloring compound; and
shaping the resin film.

(32) The method for producing the polarized film as described in (31) as above, wherein the resin film is a thermoplastic polyester film.

(33) The method for producing the polarized film as described in (32) as above, wherein the step of shaping the resin film includes:
shaping the thermoplastic polyester film under the temperature condition of the glass transition temperature of the thermoplastic polyester+20° C. or higher and the glass transition temperature+120° C. or lower.

In the present invention, the "high-contrast property" means visual characteristics that when an object is observed through a plastic polarized lens visually, the color, the brightness, and the outline of the object can be clearly perceived and there is clear distinction between the object and the object or between the object and the background.

The plastic polarized lens of the present invention has an improved contrast property allowing clear perception of color contrast or the outline of an object, and thus, the visibility is excellent as well as the visual fatigue is reduced. Further, since the polarized film itself contains a predetermined organic coloring compound, partial color difference attributable to difference in the thickness of lenses is suppressed, and the appearance is improved even when applied to a lens having partially different thickness, such as a lens for vision correction. In addition, since the plastic polarized lens has excellent water resistance, time deterioration is inhibited. Further, it has an excellent construction for processing characteristics, and thus, it is capable of providing a thinner lens and suitable for mass production. The plastic polarized lens provided with such characteristics is particularly useful as a polarized lens for spectacles.

Furthermore, the method for producing the plastic polarized lens of the present invention is.

In addition, the polarized film of the present invention can provide a polarizing function and can be provided with a high contrast property, and can be suitably used particularly for a polarized lens.

DESCRIPTION OF EMBODIMENTS

Hereinbelow, the embodiments of the present invention will be described with reference to the drawings. Further, in all the drawings, the same symbols are attached to the same components and the explanations thereof will not be repeated.

Figure 1:
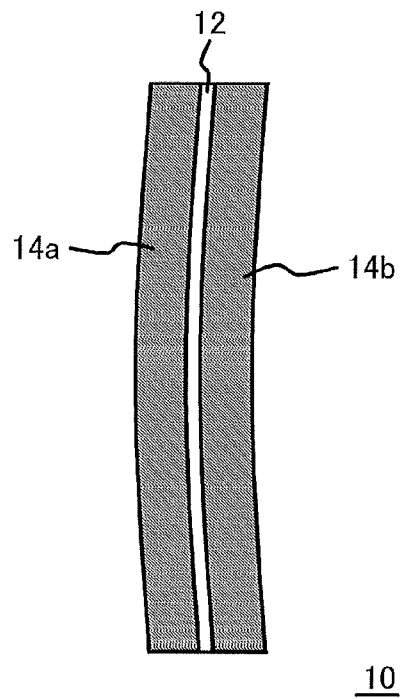
FIG. 1 is a cross-sectional view schematically showing a plastic polarized lens according to an embodiment.

As shown in FIG. 1, the plastic polarized lens 10 of the present embodiment has resin layers (plastic lenses) 14a and 14b including a thiourethane-based resin on both surfaces of a polarized film 12. The polarized film 12 contains an organic coloring compound.

The thermoplastic resin as a resin constituting the polarized film is not particularly limited, and examples thereof include a thermoplastic polyolefin, a thermoplastic polyimide, and a thermoplastic polyester. From the viewpoints of water resistance, heat resistance, and mold processability, the thermoplastic polyester is preferable.

As the thermoplastic polyester, specifically, polyethylene terephthalate, polyethylene naphthalate, polybutylene terephthalate, or the like can be used, and from the viewpoint of the effects above, polyethylene terephthalate is particularly preferable. Those modified by an approach, such as addition of copolymerization components are also included.

As the organic coloring compound in the present embodiment, those which are insoluble in water and do not cause decomposition, discoloration, or the like at the melting point of the resin constituting the polarized film are used. In the present embodiment, those which do not cause decomposition, discoloration, or the like at the melting point of the thermoplastic polyester are preferable, and a compound having a porphyrin skeleton can be used.

As the compound having a porphyrin skeleton, specifically, a tetraazaporphyrin compound represented by the following general formula (1) is preferably used.

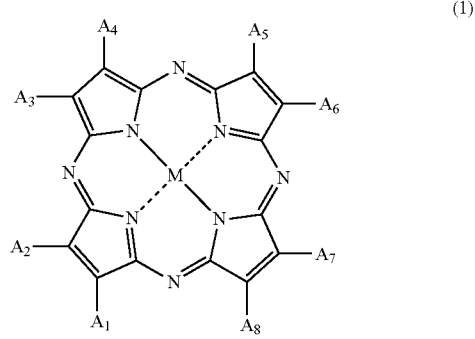

(1)

In the formula (1), $A_1$ to $A_8$ each independently represent a hydrogen atom, a halogen atom, a nitro group, a cyano group, a hydroxy group, an amino group, a carboxyl group, a sulfone group, a linear, branched, or cyclic alkyl group having 1 to 20 carbon atoms, an alkoxy group having 1 to 20 carbon atoms, an aryloxy group having 6 to 20 carbon atoms, a monoalkylamino group having 1 to 20 carbon atoms, a dialkylamino group having 2 to 20 carbon atoms, an aralkyl group having 7 to 20 carbon atoms, an aryl group having 6 to 20 carbon atoms, a heteroaryl group, an alkylthio group having 1 to 20 carbon atoms, or an arylthio group having 1 to 20 carbon atoms, or may form a ring other than an aromatic ring through a linking group. As $A_1$ to $A_8$, a linear, branched, or cyclic alkyl group having 1 to 20 carbon atoms is preferable, a linear or branched alkyl group having 1 to 20 carbon atoms is more preferable, and a linear or branched alkyl group having 2 to 10 carbon atoms is particularly preferable.

M represents two hydrogen atoms, a divalent metal atom, a trivalent mono-substituted metal atom, a tetravalent di-substituted metal atom, or an oxy metal).

Examples of the divalent metal atom include Cu (II), Zn (II), Co (II), Ni (II), Ru (II), Rh (II), Pd (II), Pt (II), Mn (II), Mg (II), Ti (II), Be (II), Ca (II), Ba (II), Cd (II), Hg (II), Pb (II), and Sn (II).

Examples of the trivalent mono-substituted metal atom include Al—Cl, Al—Br, Al—F, Al—I, Ga—Cl, Ga—F, Ga—I, Ga—Br, In—Cl, In—Br, In—I, In—F, Tl—Cl, Tl—Br, Tl—I, Tl—F, Al—$C_6H_5$, Al—$C_6H_4(CH_3)$, In—$C_6H_5$, In—$C_6H_4(CH_3)$, In—$C_6H_5$, Mn(OH), Mn(O$C_6H_5$), Mn(OSi($CH_3$)$_3$), Fe—Cl, and Ru—Cl.

Examples of the tetravalent di-substituted metal atom include CrCl$_2$, SiCl$_2$, SiBr$_2$, SiF$_2$, SiI$_2$, ZrCl$_2$, GeCl$_2$, GeBr$_2$, GeI$_2$, GeF$_2$, SnCl$_2$, SnBr$_2$, SnF$_2$, TiCl$_2$, TiBr$_2$, TiF$_2$, Si(OH)$_2$, Ge(OH)$_2$, Zr(OH)$_2$, Mn(OH)$_2$, Sn(OH)$_2$, TiR$_2$, CrR$_2$, SiR$_2$, SnR$_2$, GeR$_2$ (in which R represents an alkyl group, a phenyl group, a naphthyl group, or a derivative thereof), Si(OR')$_2$, Sn(OR')$_2$, Ge(OR')$_2$, Ti(OR')$_2$, Cr(OR')$_2$ (in which R' represents an alkyl group, a phenyl group, a naphthyl group, a trialkylsilyl group, a dialkylalkoxysilyl group, or a derivative thereof), Sn(SR'')$_2$, and Ge(SR'')$_2$ (in which R'' represents an alkyl group, a phenyl group, a naphthyl group, or a derivative thereof).

Examples of the oxy metal include vanadium oxide (—V(=O)—), manganese oxide (—Mn(=O)—), and titanium oxide (—Ti(=O)—).

As M, a divalent metal atom or an oxy metal is preferable, a copper atom (Cu (II)), a palladium atom (Pd (II)), or vanadium oxide (—V(=O)—) is more preferable, and a copper atom (Cu (II)) is particularly preferable.

By using the tetraazaporphyrin compound represented by the general formula (1) as an organic coloring compound, it is possible to perceive the color contrast or the outline of an object clearly, and improve the contrast property, and therefore, a plastic polarized lens having excellent visibility as well as reduced vision fatigue can be provided.

As the tetraazaporphyrin compound represented by the general formula (1), a tetraazaporphyrin compound represented by the following general formula (1a) is preferably used.

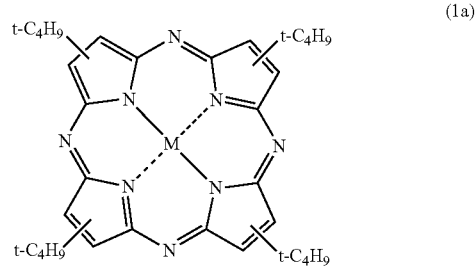

(1a)

In the formula (1a), t-$C_4H_9$ represents a tertiary butyl group. Four tertiary butyl groups correspond to $A_1$ or $A_2$, $A_3$ or $A_4$, $A_5$ or $A_6$, and $A_7$ or $A_8$, respectively, in the formula (1), and represent a position isomer structure. Further, four groups ($A_1$ or $A_2$, $A_3$ or $A_4$, $A_5$ or $A_6$, and $A_7$ or $A_8$) that are not tertiary butyl groups in $A_1$ to $A_8$ represent a hydrogen atom. M represents a divalent copper atom, a divalent palladium atom, or divalent vanadium oxide (—V(=O)—).

As the tetraazaporphyrin compound represented by the general formula (1) or (1a), compounds represented by the following formulae (2) to (4) can be used.

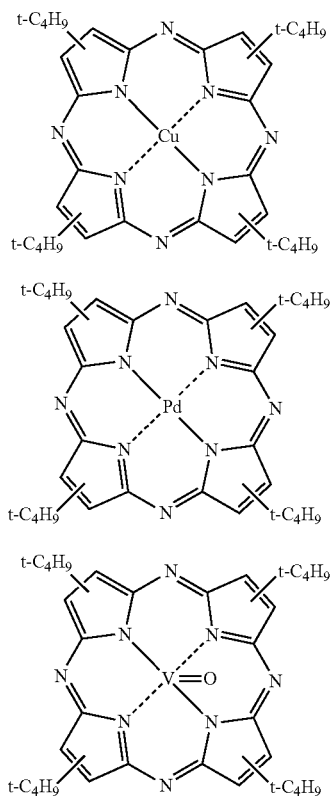

(2)

(3)

(4)

In the formulae (2) to (4), t-$C_4H_9$ represents a tertiary butyl group. These four tertiary butyl groups correspond to $A_1$ or $A_2$, $A_3$ or $A_4$, $A_5$ or $A_6$, and $A_7$ or $A_8$, respectively, in the formula (1), and represent a position isomer structure. Further, $A_1$ to $A_8$ that are not tertiary butyl groups represent a hydrogen atom. Further, in the formula (2), Cu represents divalent copper, in the formula (3), Pd represents divalent palladium, and in the formula (4), V=O represents divalent vanadium oxide.

These compounds can be produced by, for example, the method described in Japanese Patent Laid-Open Application No. 11-116574, Japanese Patent Laid-Open Application No. 11-130971, Japanese Patent Laid-Open Application No. 2006-321925, Japanese Patent Laid-Open Application No. 2007-099744, or the like.

As the tetraazaporphyrin compound, a tetra-t-butyl-tetraazaporphyrin-copper complex represented by the formula (2) is preferably used from the viewpoints of the effects above.

As for the content of the organic coloring compound, the preferable amount varies depending on the thickness of the polarized film 12, and can be appropriately determined by the thickness, but it is preferably contained in the amount of 50 to 7000 ppm, more preferably 50 to 2000 ppm, and still more preferably 50 to 500 ppm, in the polarized film 12.

In the case where the content of the organic coloring compound in the polarized film is less than 50 ppm, there is a room for improvement in the contrast, whereas if the content is more than 7000 ppm, the contrast becomes strong, and thus, in some cases, there are cases of feeling sickness when wearing spectacles made with a polarized lens including polarized film. That is, by incorporating the organic coloring compound in the above-described amount into the polarized film 12, it is possible to perceive the color contrast and the outline of an object more clearly and the contrast property is particularly improved. Accordingly, it is possible to provide a plastic polarized lens with a high contrast property, having excellent visibility as well as particularly reduced vision fatigue.

The polarized film 12 is obtained by shaping a resin film containing an organic coloring compound. The forming step can be carried out by an ordinary method. In the present embodiment, it is preferable to use a thermoplastic polyester film as a resin film, and in this case, the thermoplastic polyester film containing an organic coloring compound is preferably a film formed under the condition of a temperature T1 represented by the following formula:

Glass transition temperature of the thermoplastic polyester+20° C.≤$T1$≤Glass transition temperature of the thermoplastic polyester+120° C. (Formula)

In the related art, in order to prepare a large number of polarized lenses industrially, it is necessary to polish the outer circumference of a lens after polymerization with an edger or the like, and in this case, the polarized film and the lens base material sometimes peel away from each other. Accordingly, there has been a demand for a polarized lens having excellent adhesiveness between a polarized film and a plastic lens, which suppresses the peeling-off and is capable of producing a polarized lens industrially with a high yield.

The polarized film 12 of the present embodiment is formed in a desired curvature under this temperature condition, using a thermoplastic polyester film as a resin film, and thus it has excellent adhesiveness to the resin layers 14a and 14b. Therefore, the plastic polarized lens of the present embodiment has excellent productivity and is appropriate for mass production.

Furthermore, the plastic polarized lens of the present embodiment, in which thiourethane-based resin layers 14a and 14b including a thiourethane-based resin are laminated on both surfaces of the polarized film 12, has excellent water resistance, suppressed uncomfortable feeling on wearing, capability of providing a thin lens, and further, suppressed peeling-off of the polarized film during a downstream process of polishing the periphery. That is, it is excellent in the balance of these characteristics. This effect is exhibited clear in the case of using the polarized film 12 including a thermoplastic polyester.

In addition, in the present embodiment, a surface modification treatment may be carried out on at least one surface of the polarized film 12 or an adhesive layer may be provided thereon, and further, the surface modification treatment and the formation of an adhesive layer may be carried out sequentially. By this, the adhesiveness of the polarized film 12 and the resin layers 14a and 14b including the thiourethane-based resin, can be improved. Examples of the adhesive layer include a layer including a urethane-based resin containing a polyhydroxy compound-derived structural unit and a polyisocyanate compound-derived structural unit, and examples of the surface modification treatment include a plasma treatment on a film surface.

The method of producing the plastic polarized lens will be described below.

<Method of Producing Plastic Polarized Lens>

The method of producing the plastic polarized lens of the present embodiment includes the following steps.

(a) a step of producing the resin film including the above-described organic coloring compound;

(b) a step of shaping the resin film to produce a polarized film;

(c) a step of fixing the polarized film in a lens casting mold in a state in which the polarized film is apart from the mold;

(d) a step of injecting a mixture into the space between both surfaces of the polarized film and the mold; and (e) a step of polymerization and curing the mixture and laminating layers including a thiourethane-based resin on both surfaces of the polarized film.

The respective steps will be described in the order below.

(a) Step of Preparing Resin Film Including Above-Described Organic Coloring Compound For the polarized film provided with the high-contrast property of the present embodiment, a specific amount of a water-insoluble dye including at least one dichroic dye is added to a resin, and the organic coloring compound is added thereto in an amount calculated to give the above-described amount in the polarized film and mixed to obtain a resin composition. This resin composition is molded to a film shape by a predetermined method. Then, the obtained film is stretched in the uniaxial direction, and then subjected to a heating treatment at a predetermined temperature to prepare a polarized film. Further, in the present embodiment, it is preferable to use a thermoplastic polyester as a resin.

As the dichroic dye used in the present embodiment, a direct dye that is soluble in water is not preferable and any one may be appropriately selected from water-insoluble known dyes that are disperse dyes and acidic dyes. Specific examples thereof include anthraquinone-based coloring agents, quinophthalone-based coloring agents, and azo-based coloring agents. Further, it is preferable that the coloring agent do not cause deterioration such as decomposition and discoloration at the melting point of a polyester-based resin base material. Examples of the dichroic dye include dyes disclosed in Patent Application Publication No. 04-30986, Japanese Patent Laid-Open Application No. 61-087757, Japanese Patent Laid-Open Application No. 61-285259, Japanese Patent Laid-Open Application No. 62-270664, Japanese Patent Laid-Open Application No. 62-275163, Japanese Patent Laid-Open Application No. 01-103667, and the like.

Preferred examples of these derivatives include the exemplary compounds represented by the formulae (5), (6), (7), and (8).

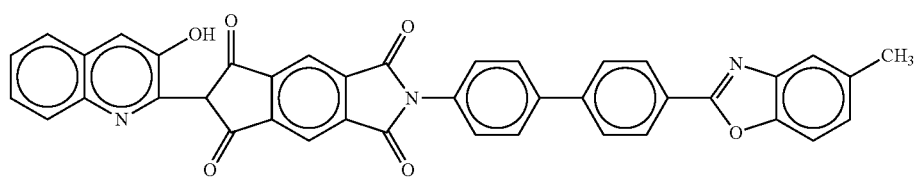

(5)

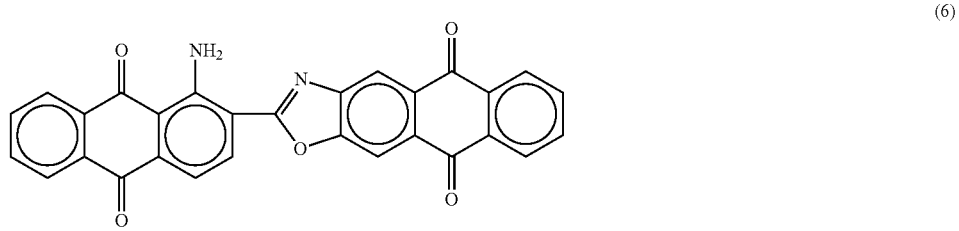

(6)

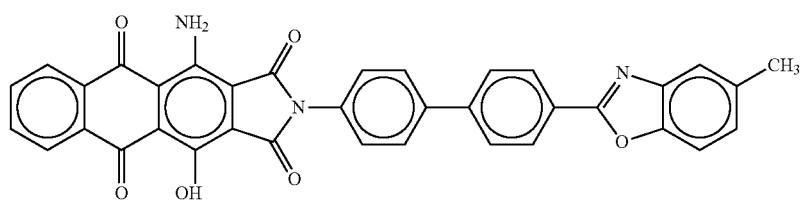

(7)

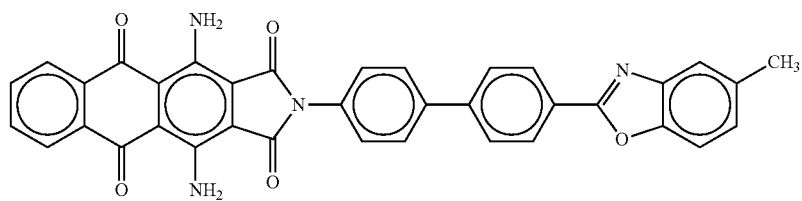

(8)

Considering the polarization degree of the polarized film, the light transmission rate, or the like, the addition amount of the dichroic dye is preferably from 0.005 to 4 parts by weight with respect to 100 parts by weight of the resin.

When the polarized film of the present embodiment is prepared, the resin and the organic coloring compound may be mixed with the dichroic dye to give a resin composition. In order to give a favored color, a plurality of generally used coloring agents may be added.

The method for producing the resin composition is not particularly limited, but examples thereof include methods for mixing both using a known ribbon blender, a tumbler mixer, and the like. The mixing temperature does not interfere with the temperature around room temperature. If necessary, other additives such as an ultraviolet ray absorbent may be added. The method for forming a film with a resin composition including an organic coloring compound and a dichroic dye is not particularly limited, and known methods may be included. For example, the film is formed by a T-die extrusion method using a known uniaxial or biaxial extruder, or an inflation extrusion method. Typically, the temperature for forming a film is in a range of the melting temperature to lower than the decomposition temperature of the resin.

Subsequently, the obtained film is stretched in the uniaxial direction. The stretching method is not particularly limited, and carried out by a known method. Usually, for the stretching condition, the stretching is carried out in a range of the glass transition temperature of the resin to lower than the melting temperature to 2 to 10 times in a uniaxial direction. The stretching direction may be a machine direction or may be a direction perpendicular to the machine direction. Further, by carrying out an annealing treatment in the stretching direction in the fixed state, a polarized film can be obtained. The annealing treatment may be carried out at any time of during curve processing and after curve processing. The annealing treatment method is not particularly limited, and carried out by a known method. Usually, the annealing treatment is carried out in the temperature range of the crystallization temperature to lower than the melting temperature of the resin, for 5 seconds to 30 minutes, in the stretching direction in the fixed state.

(b) Step of Forming Resin Film to Produce Polarized Film

Shaping of the resin film can be usually carried out by an ordinary method. Examples of the shaping method include vacuum shaping, pressurization shaping, vacuum-pressurization shaping, and press shaping. In these methods, the temperature of the resin film is adjusted to a predetermined temperature range, and the resin film is shaped into a desired curvature shape. In the method for shaping the resin film, conditions such as the shaping pressure and the shaping time are appropriately adjusted in correspondence to the shaping method, the temperature during the shaping, a production apparatus, and the like. In addition, the resin film may be heated to a predetermined temperature before shaping with a die and the like.

The shaping of the thermoplastic polyester film can be performed under a temperature condition of the glass transition temperature of the thermoplastic polyester+20° C. or higher, the glass transition temperature of the thermoplastic polyester+120° C. or lower, preferably under a temperature condition of the glass transition temperature of the thermoplastic polyester+20° C. or higher, the glass transition temperature of the thermoplastic polyester+100° C. or lower, and still more preferably under a temperature condition of the glass transition temperature of the thermoplastic polyester+40° C. or higher, the glass transition temperature of the thermoplastic polyester+100° C. or lower. As for the method for shaping the thermoplastic polyester film, a typical method can be used as long as the film is heated at the above-mentioned temperature and can be given a desired curvature shape.

With the above-described temperature, the adhesiveness between the polarized film including a thermoplastic polyester and the layer including a thiourethane-based resin is excellent, regardless of the presence or absence of the adhesive layer.

In the case where the thermoplastic polyester is, for example a polyethylene terephthalate containing an organic coloring compound, the glass transition temperature is 74° C., and thus, the shaping can be carried out under a temperature condition of 94° C. or higher and 194° C. and lower, preferably under a temperature condition of 94° C. or higher and 174° C. or lower, and more preferably under a temperature condition of 114° C. or higher and 174° C. or lower.

The glass transition temperature of the thermoplastic polyester can be generally measured by means of a DSC (differential scanning calorimeter).

Examples of the shaping method include the above-mentioned methods. In the shaping method, by adjusting the temperature of the thermoplastic polyester film to the temperature range and shaping the film into a desired curvature shape, the adhesiveness between the polarized film including the thermoplastic polyester film and the plastic lens can be improved.

By the production method of the present embodiment including the shaping step, the adhesiveness between the polarized film and the plastic lens is improved, the peeling-off in the outer circumference polishing step is suppressed, and the productivity of the plastic polarized lens is improved. That is, a polarized lens can be prepared industrially with a high yield.

In addition, by the production of the present embodiment, the adhesiveness between the polarized film and the plastic lens is provided or improved by a simple method, and therefore, there is no need to separately provide a step of improving the adhesiveness and a plastic polarized lens having excellent adhesiveness can be obtained by a simple method. Further, a step carried out to improve the adhesiveness is not excluded.

In the present embodiment, a surface modification treatment may be carried out or an adhesive layer may be provided separately on at least one surface of the resin film or polarized film, and further, the surface modification treatment and the formation of an adhesive layer may be carried out in this order. By this, the adhesiveness of the polarized film 12 and the resin layers 14a and 14b including the thiourethane-based resin can be further improved. Preferred examples of the adhesive layer include a layer including a urethane-based resin containing a polyhydroxy compound-derived structural unit and a polyisocyanate-derived structural unit, or a layer including an acrylic acid ester polymer-based resin which may contain a functional group, and examples of the surface modification treatment include plasma treatment and corona discharge treatment of the film surface.

Before providing an adhesive layer on the polarized film surface, at least one kind of pretreatments selected from those such as gas or chemical solution treatment, corona discharge treatment, plasma treatment, ultraviolet ray irradiation treatment, electron beam irradiation treatment, surface roughening treatment, and firing treatment may be carried out on the polarized film in advance.

In the present embodiment, a coating agent is usually used to form the adhesive layer on the polarized film. The coating agent may contain no solvent, but a solvent-based or dispersion-based coating agent including an appropriate solvent is preferred.

The solvent can be selected from alcohol compounds such as methanol, ethanol, and isopropanol, aromatic compounds such as toluene and xylene, ester compounds such as ethyl acetate, ketone compounds such as acetone, methyl ethyl ketone, and methyl isobutyl ketone, halogen compounds such as dichloromethane, and the like, and the solvent may be used alone or combination of two or more kinds thereof. As the alcohol compounds, isopropanol is preferably used.

The concentration of the coating agent in terms of the resin is from 0.1 to 50% by weight, preferably from 1 to 50% by weight, and more preferably 3 to 30% by weight. When it is more than 50% by weight, the temporal stability of the coating solution becomes deficient, the existence of the coated layer becomes visible because the coated layer thickens due to too much urethane resin being coated, or a decrease in adhesiveness may occur due to peel-off within the coated layer. On the other hand, when it is less than 0.1% by weight, the effect of improvement of the adhesiveness between the film and the urethane resin base material cannot be fully obtained.

The thickness of the coated layer should be 30 to 0.001 μm, preferably 10 to 0.01 μm, and more preferably 5 to 0.05 μm.

In the present embodiment, the coating agent is coated as necessary on both surfaces of the polarized film, and the coating solution portion which has fluidity on the film is removed from the film as necessary and dried. There is no particular limit on the drying temperature, but it is usually in a range of 5 to 100° C., preferably 20 to 100° C., more preferably 20 to 80° C., and particularly preferably 20 to 60° C., or these temperatures may be combined and heating can be performed in steps.

The drying time is set depending on the solvent used, the drying temperature, the blowing conditions, and the like, and is not particularly limited, but it is usually in the rage of 1 minute to 48 hours, and more preferably 10 minutes to 24 hours.

In the present embodiment, the method for forming the adhesive layer on the polarized film is not particularly limited. However, the methods are largely classified into a method in which the polarized film is treated with a coating agent and then processed to have curvature, a method in which the polarized film is processed to have curvature and then treated with a coating agent, or a method including a combination of both, but any one of the methods can be employed, and according to each situation, a conventionally known method such as a roll-coating method, a spin-coating method, a spray-coating method, a bar-coating method, and a dipping method or the like may be used. After drying, the coating can be performed once or more, and the types of the coating solutions used each time may be the same as or different from each other. Typically, the object of the present embodiment can be achieved by one instance of coating and drying without repeated coating.

After coating the polarized film with the above-mentioned coating agent as necessary, drying and/or heat treatment is carried out as necessary. The applied temperature upon application of the drying and/or heat treatment is not particularly limited as long as it does not substantially deteriorate the performance of the polarized film. After coating the resin on the polarized film, an active energy line may be irradiated thereon. Examples of the active energy line include ultraviolet rays and an electron beam.

Preferred examples of the urethane-based resin used as the coating agent is a polymer including a polyhydroxy compound-derived structural unit and a polyisocyanate-derived structural unit. Examples of the polyhydroxy compound include polyester diol, polyether diol, polythioether diol, polylactone diol, and polyacetal diol. Among them, polyester diol and polyether diol are preferable, and polyester diol is particularly preferable.

Examples of the polyester diol include polyesters having a hydroxyl group at the terminal, which can be obtained by reacting dials or polyhydric alcohols, for example saturated polyhydric alcohols such as ethylene glycol, propylene glycol, butylene glycol, diethylene glycol, neopentyl glycol, hexamethylene glycol, trimethylolpropane, and 3-methyl 1,5-pentanediol or unsaturated polyhydric alcohols such as butanediol, or a mixture thereof, with organic dicarboxylic acids, for example, saturated aliphatic acids such as adipic acid and sebacic acid, unsaturated aliphatic acids such as maleic acid and fumaric acid, aromatic carboxylic acids such as isophthalic acid, phthalic acid, and terephthalic acid, or anhydrides thereof, or a mixture thereof; and polyesters obtained by ring-opening polymerization of lactones such as caprolactam and methylcaprolactone with diols.

Specific examples of the polyether diol include a polymer or copolymer having a hydroxyl group at the terminal, which is obtained by ring-opening polymerization or ring-opening copolymerization of ethylene oxide, propylene oxide, epichlorohydrin, oxacyclobutane, substituted oxacyclobutane, and tetrahydrofuran; and a mixture thereof.

Examples of the polyisocyanate which is a monomer of the above-mentioned urethane-based resin include 1,4-tetramethylene diisocyanate, 1,6-hexamethylene diisocyanate, 1,8-octamethylene diisocyanate, 1,10-decamethylene diisocyanate, 1,4-cyclohexylene diisocyanate, tolylene diisocyanate, 1,3-phenylene diisocyanate, 4,4'-methylenebis(cyclohexyl isocyanate), 4,4'-diphenylmethane diisocyanate, isophorone diisocyanate, and triphenylmethane triisocyanate, and at least one kind or at least two kinds thereof can be selected and used.

Among them, 1,6-hexamethylene diisocyanate, 1,4-cyclohexylene diisocyanate, tolylene diisocyanate, 1,3-phenylene diisocyanate, 4,4'-methylenebis(cyclohexyl isocyanate), 4,4'-diphenylmethane diisocyanate, and isophorone diisocyanate are particularly preferable.

The polyhydroxy compound and polyisocyanate which constitute the urethane-based resin can be suitably selected from these examples and combined together. Among them, the polyhydroxy compound is preferably polyester diol, more preferably polyester diol composed of adipic acid, butylene glycol and 3-methyl 1,5-pentanediol. On the other hand, the isocyanate component is preferably isophorone diisocyanate. From the viewpoint of adhesiveness between the film and the resin base material, this combination is particularly preferable.

The acrylic acid ester polymer-based resin which may have a functional group used as the coating agent may be a reaction-curable one or a non-reactive one, among which the non-reactive one is more preferable.

Examples of the acrylic acid ester polymer-based resin which may have a functional group include a linear or branched, noncyclic or cyclic, or non-aromatic or aromatic alcohol or a copolymer of a (meth)acrylic acid ester monomer comprised of phenol and (meth)acrylic acid. Here, the (meth)acrylic acid represents acrylic acid or methacrylic acid. The (meth)acrylic acid ester monomer substantially has one or more (meth)acrylic acid ester groups in one molecule, but mono(meth)acrylic acid ester monomers substantially having one (meth)acrylic acid ester group are more preferable.

Specific examples of the mono(meth)acrylic acid ester monomer include methyl(meth)acrylate, ethyl(meth)acrylate, n-propyl(meth)acrylate, isopropyl(meth)acrylate, n-butyl(meth)acrylate, isobutyl(meth)acrylate, t-butyl(meth)acrylate, n-hexyl(meth)acrylate, 2-ethylhexyl(meth)acrylate, isononyl(meth)acrylate, stearyl(meth)acrylate, cyclohexyl(meth)acrylate, isobornyl(meth)acrylate, norbornane(meth)acrylate, benzyl(meth)acrylate, 2-methoxyethyl(meth)acrylate, (meth)acrylic acid esters of methoxypolyethylene glycol, (meth)acrylic acid esters of methoxypolypropylene glycol, and (meth)acrylic acid esters of phenoxypolyethyl glycol.

Among these, methyl(meth)acrylate, isobutyl(meth)acrylate, and the like are preferably used.

Examples of the functional group of the acrylic acid ester polymer having a functional group include a carboxylic acid group, a hydroxyl group, a glycidyl group, an amide group, and an anhydride group, and the polymer has one or more functional groups.

Examples of the monomer functional group constituting the acrylic acid ester polymer having a functional group include ethylenically unsaturated carboxylic acids such as (meth)acrylic acid, itaconic acid, fumaric acid, (meth)acrylic acid ester of 2-hydroxyethylphthalic acid, and (meth)acrylic acid ester of 2-hydroxyethylsuccinic acid, ethylenically unsaturated sulfonic acids such as 2-sulfoethyl(meth)acrylic acid, ethylenically unsaturated phosphonic acids such as vinylphosphonic acid, 2-hydroxyethyl(meth)acrylate, 3-hydroxypropyl(meth)acrylate, hydroxybutyl(meth)acrylate, glycidyl(meth)acrylate, methaglycidyl(meth)acrylate, (meth)acrylic acid amide, mono- or dialkyl-substituted (meth)acrylic acid amide, dimethylaminoethyl(meth)acrylic acid amide, N-methylol(meth)acrylic acid amide, N-vinylpyrrolidone, N-vinylcaprolactam, and alkyl vinyl ethers.

Among these, 2-hydroxyethyl(meth)acrylate and the like are preferably used.

The acrylic acid ester polymer having a functional group is constituted with one or more monomers selected from the monomers having the above-described functional groups, in addition to one or more of the above-described (meth)acrylic acid ester monomers.

The monomers constituting a copolymer of the (meth)acrylic acid ester monomers may include vinyl monomers within a range not interfering with the range of the present invention, and examples of the vinyl monomers include vinyl esters such as vinyl acetate and vinyl propionate, substituted or unsubstituted styrenes such as styrene and α-methylstyrene, and vinyl halides. The amount of the vinyl monomer is preferably in a range of 0 to 40 parts by weight, more preferably 0 to 20 parts by weight, still more preferably 0 to 10 parts by weight, and particularly preferably 0 to 5 parts by weight, based on 100 parts by weight of the monomers constituting the copolymer of the (meth)acrylic acid ester monomers.

Specific examples of the gas or chemical treatment as described above include gas treatments using ozone, halogen gas, chlorine dioxide, or the like, or chemical solution treatments using oxidizing agents or reducing agents such as sodium hypochlorite, alkali metal hydroxides, alkaline earth metal hydroxides, sodium metals, sulfuric acid, nitric acid and the like, or acid radicals and bases. In the chemical solution treatment, the oxidizing agents and reducing agents, or the acid radicals and bases are typically dissolved in water, alcohol, liquid ammonia, or the like and employed in a liquid state.

When the chemical for the treatment is alkali metal hydroxides and/or alkaline earth metal hydroxides, examples of the alkali metal hydroxides include lithium hydroxide, sodium hydroxide, and potassium hydroxide, examples of the alkaline earth metal hydroxide include magnesium hydroxide, calcium hydroxide, and barium hydroxide, and at least one kind of these may be selected and used. Among them, sodium hydroxide and potassium hydroxide are preferable, and sodium hydroxide is particularly preferable.

It is preferable that the alkali metal hydroxides and/or alkaline earth metal hydroxides be used as the solution; and examples of the solvent for the solutions include water and/or organic solvents and examples of the organic solvent include methanol, ethanol, and isopropanol.

The concentration of the solution is suitably in a range of 5 to 55% by weight, and preferably 10 to 45% by weight; and the temperature of the solution is suitably in a range of 0 to 95° C., preferably 20 to 90° C., and more preferably 30 to 80° C.

The pretreatment by the alkali metal hydroxide and/or the alkaline earth metal hydroxide in the present embodiment can be carried out by bringing the solution, which is within the above-mentioned solution concentration and solution temperature range, into contact with one side or both sides of the polarized film for a predetermined period of time. As the method of contact, there are no particular limits, and for example, a method of immersing of the polarized film into the solution, or contacting with the polarized film by showering or surface-flowing can be suggested. Among them, the method of immersing the polarized film into the solution is preferable. During this time, in order to uniformize the concentration and the temperature of the solution, methods such as stirring, convection current flowing, and jet flowing can be adopted. The time period of contact is not particularly limited, but it is preferably in a range of 1 minute to 24 hours, more preferably 5 minutes to 10 hours, and particularly preferably 5 minutes to 5 hours.

In order to bring the alkali metal hydroxide and/or the alkaline earth metal hydroxide solution into contact with the polarized film, physical stimulation such as ultrasound sonication or vibration may be used in combination therewith.

For the purpose of improving the wetting of the polarized film with the solution, the alkali metal hydroxide and/or alkaline earth metal hydroxide solution may contain anionic or nonionic surfactants, and the like.

When a solution of the alkali metal hydroxide and/or the alkaline earth metal hydroxide is brought in contact with the polarized film, the solution concentration, the solution temperature, and the contact time can be appropriately selected and carried out within a range substantially not interfering with the optical characteristics of the polarized film.

After a solution of the alkali metal hydroxide and/or the alkaline earth metal hydroxide is brought in contact with the polarized film, the polarized film is pulled out of the solution, and as necessary, the washing and drying of the polarized film may be carried out with water and/or organic solvents such as methanol, ethanol, isopropanol, acetone, and methyl ethyl ketone.

The corona discharge treatment mentioned above is a kind of gas discharge, in which the gas molecules ionize to exhibit conductivity and uses the phenomenon in which the film surface is activated by the ion flows, which is a surface treatment technique employed widely. Examples of the gas for the discharge treatment include air, but the gas may be gases such as nitrogen, carbon dioxide, and ammonia gas. The corona discharge treatment can be achieved, for example, by a method of treating the polarized film surface using the corona generated by applying voltage to electrodes of a known high frequency generation apparatus. The corona discharge treatment strength should be preferably 1 to 500 W·min/m$^2$, and more preferably 5 to 400 W·min/m$^2$.

Examples of the plasma treatment include a normal pressure plasma treatment and a vacuum plasma treatment (low temperature plasma treatment).

In the normal pressure plasma treatment, the discharge treatment is carried out within a single or mixed gas atmosphere such as air, water vapor, argon, nitrogen, helium, carbon dioxide, carbon monoxide, alcohols such as IPA, and carboxylic acids such as acrylic acid.

The vacuum plasma treatment can be carried out with a reduced pressure, for example, by placing the polarized film inside a discharge treatment apparatus of an internal electrode type which has counter electrodes composed of a drum-shaped electrode and plural rod-shaped electrodes, and under a treatment gas atmosphere of 0.001 to 50 Torr, preferably 0.01 to 10 Torr, and more preferably 0.02 to 1 Torr, supplying a high voltage of direct current or alternating current between the electrodes and discharging, generating plasma of the treatment gas, and exposing the polarized film surface thereto. Although the treatment conditions of the vacuum plasma treatment depend on the treatment apparatus, the type of treatment gas, the pressure, the frequency of the power source and the like, the preferable conditions may be set suitably. Examples of the gas for treatment include argon, nitrogen, helium, carbon dioxide, carbon monoxide, air, water vapor, alcohols such as IPA, and carboxylic acids such as acrylic acid. These may be used alone or in a mixture thereof.

Figure 2:
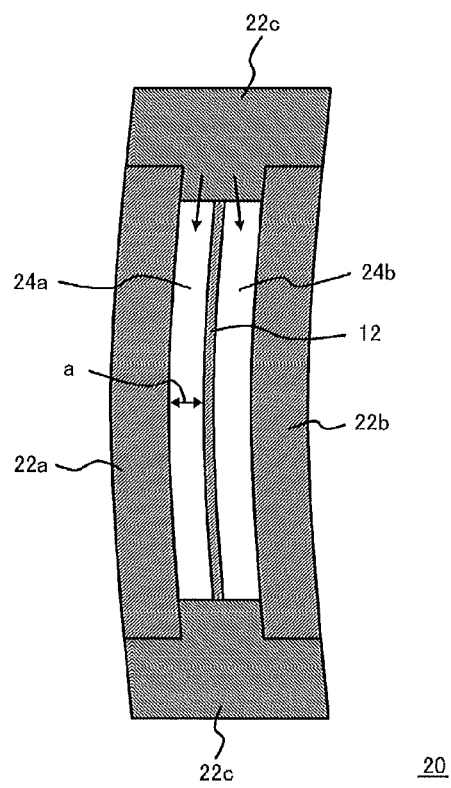
FIG. 2 is a cross-sectional view schematically showing a lens casting mold according to an embodiment.

(c) Step of Fixing the Polarized Film in Lens Casting Mold in State in which Polarized Film is Apart from Mold As shown in FIG. 2, the plastic polarized lens of the present embodiment is obtained by injecting a mixture of a specific isocyanate compound and a specific active hydrogen compound into a lens casting mold 20 where the polarized film 12 is fixed thereto, and performing polymerization and curing.

The lens casting mold 20 is generally constituted with two molds 22a and 22b, maintained by a gasket 22c.

As the material of the gasket 22c, polyvinyl chloride, a vinyl ethylene-acetate copolymer, an ethylene-ethyl acrylate copolymer, an ethylene-propylene copolymer, an ethylene-propylene-diene copolymer, a polyurethane elastomer, a fluorine rubber, or a soft elastic resin in which polypropylene is blended with them is used. A material which does not swell or elute with respect to a mixture of a specific isocyanate compound and a specific active hydrogen compound employed in the present embodiment is preferred.

Examples of the material of the mold 22a and 22b include glass and metal, and glass is usually used. A mold releasing agent may be coated on molds 22a and 22b in advance in order to improve the mold-releasing property of the obtained lens. In addition, a coating solution which affords a hard coating ability to the lens material may be coated on the molds in advance.

Inside the space of the lens casting mold 20, the polarized film 12 is installed so that the film surface is parallel to the inner surface of the front side mold 22a which it faces. Between the polarized film 12 and the molds 22a and 22b, space portions 24a and 24b are formed, respectively. The separated distance "a" of the space portions 24a and 24b where the space is the narrowest is about 0.2 to 2.0 mm.

Since the mixture of the (A) isocyanate compound and the (B) active hydrogen compound having a thiol group is used in the present embodiment, viscosity is low during injection and thus, the mixture can be injected easily even into the above-mentioned spaces of intervals.

(d) Step of Injecting Mixture in Spaces Between Both Surfaces of Polarized Film and Mold.

Subsequently, inside the space of the lens casting mold 20, at the two space portions 24a and 24b between the molds 22a and 22b and the polarized film 12, the mixture of (A) a specific isocyanate compound and (B) a specific active hydrogen compound is injected by a predetermined injection unit.

The (A) isocyanate compound used in the present embodiment includes a compound having an isothiocyanate group, and specifically, it is a compound of one or more kinds or two or more kinds selected from a polyisocyanate compound, an isocyanate compound having an isothiocyanate group, and a polyisothiocyanate compound.

Examples of the polyisocyanate compounds include:

aliphatic polyisocyanate compounds such as hexamethylene diisocyanate, 2,2,4-trimethylhexane diisocyanate, 2,4,4-trimethylhexamethylene diisocyanate, lysine diisocyanatomethyl ester, lysine triisocyanate, m-xylylene diisocyanate, α,α,α',α'-tetramethylxylene diisocyanate bis(isocyanatomethyl)naphthalene, mesitylylene triisocyanate, bis(isocyanatomethyl)sulfide, bis(isocyanatoethyl)sulfide, bis(isocyanatomethyl)disulfide, bis(isocyanatoethyl)disulfide, bis(isocyanatomethylthio)methane, bis(isocyanatoethylthio)methane, bis(isocyanatoethylthio)ethane, and bis(isocyanatomethylthio)ethane;

alicyclic polyisocyanate compounds such as isophorone diisocyanate, bis(isocyanatomethyl)cyclohexane, dicyclohexylmethane diisocyanate, cyclohexane diisocyanate, methylcyclohexane diisocyanate, dicyclohexyldimethylmethaneisocyanate, 2,5-bis(isocyanatomethyl)bicyclo-[2.2.1]-heptane, 2,6-bis(isocyanatomethyl)bicyclo-[2.2.1]-heptane, 3,8-bis(isocyanatomethyl)tricyclodecane, 3,9-bis(isocyanatomethyl)tricyclodecane, 4,8-bis(isocyanatomethyl)tricyclodecane, and 4,9-bis(isocyanatomethyl)tricyclodecane;

aromatic polyisocyanate compounds such as phenylene diisocyanate, diphenylsulfide-4,4-diisocyanate; and heterocyclic polyisocyanate compounds such as 2,5-diisocyanatothiophene, 2,5-bis(isocyanatomethyl)thiophene, 2,5-diisocyanatotetrahydrothiophene, 2,5-bis(isocyanatomethyl)tetrahydrothiophene, 3,4-bis(isocyanatomethyl)tetrahydrothiophene, 2,5-diisocyanato-1,4-dithiane, 2,5-bis(isocyanatomethyl)-1,4-dithiane, 4,5-diisocyanato-1,3-dithiolane, and 4,5-bis(isocyanatomethyl)-1,3-dithiolane, but are not limited to the exemplary compounds.

As isocyanate compounds having an isothiocyanate group, for example, there are the polyisocyanate compounds exemplified above which have a part of the isocyanate group replaced with the isothiocyanate group, but are not limited to these.

Examples of the polyisothiocyanate compounds include:

aliphatic polyisothiocyanate compounds such as hexamethylenediisothiocyanate, lysine diisothiocyanatomethyl ester, lysine triisocyanate, m-xylylene diisothiocyanate, bis(isothiocyanatoethyl)sulfide, bis(isothiocyanatomethyl)sulfide, and bis(isothiocyanatoethyl)disulfide and the like;

alicyclic polyisothiocyanate compounds such as isophorone diisothiocyanate, bis(isothiocyanatomethyl)cyclohexane, dicyclohexylmethane diisothiocyanate, cyclohexane diisothiocyanate, methylcyclohexane diisothiocyanate, 2,5-bis(isothiocyanatomethyl)bicyclo-[2.2.1]-heptane, 2,6-bis(isothiocyanatomethyl)bicyclo-[2.2.1]-heptane, 3,8-bis(isothiocyanatomethyl)tricyclodecane, 3,9-bis(isothiocyanatomethyl)tricyclodecane, 4,8-bis(isothiocyanatomethyl)tricyclodecane, and 4,9-bis(isothiocyanatomethyl)tricyclodecane;

aromatic polyisothiocyanate compounds such as diphenyldisulfide-4,4-diisothiocyanate; and sulfur-containing heterocyclic polyisothiocyanate compounds such as 2,5-diisothiocyanatothiophene, 2,5-bis(isothiocyanatomethyl)thiophene, 2,5-diisothiocyanatotetrahydrothiophene, 2,5-bis(isothiocyanatomethyl)tetrahydrothiophene, 3,4-bis(isothiocyanatomethyl)tetrahydrothiophene, 2,5-diisothiocyanato-1,4-dithiane, 2,5-bis(isothiocyanatomethyl)-1,4-dithiane, 4,5-diisothiocyanato-1,3-dithiolane, and 4,5-bis(isothiocyanatomethyl)-1,3-dithiolane, but are not limited to the exemplary compounds.

Furthermore, these isocyanate compounds substituted with halogen such as chlorine, bromine and the like, with an alkyl group, an alkoxy group, a nitro group, or modified with polyhydric alcohol prepolymer, carbodiimide, urea, biuret, or a dimerization or trimerization reaction product of the isocyanate compounds may be used. These isocyanate compounds may be used alone or in mixture of two or more kinds thereof.

Among these isocyanate compounds, in view of high availability, cost, performance of the obtained resin, or the like, a diisocyanate compound is preferably used. For example, hexamethylene diisocyanate, isophorone diisocyanate, bis(isocyanatomethyl)cyclohexane, dicyclohexylmethane diisocyanate, 2,5-bis(isocyanatomethyl)bicyclo-[2.2.1]-heptane, 2,6-bis(isocyanatomethyl)bicyclo-[2.2.1]-heptane, m-xylylene diisocyanate, and 2,5-bis(isocyanatomethyl)-1,4-dithiane are preferably used, and 2,5-bis(isocyanatomethyl)bicyclo-[2.2.1]-heptane, 2,6-bis(isocyanatomethyl)bicyclo-[2.2.1]-heptane, and m-xylylene diisocyanate are particularly preferably used.

The (B) active hydrogen compound used in the present embodiment is an active hydrogen compound of one or more kinds or two or more kinds selected from thiol compounds or polythiol compounds having a hydroxyl group.

Examples of the thiol compounds having a hydroxyl group include:

2-mercaptoethanol, 3-mercapto-1,2-propandiol, glycerin bis(mercaptoacetate), 4-mercaptophenol, 2,3-dimercapto-1-propanol, pentaerythritol tris(3-mercaptopropionate), and pentaerythritol tris(thioglycolate), but are not limited to the exemplary compounds.

Example of the polythiol compounds include:

aliphatic polythiol compounds such as methanedithiol, 1,2-ethanedithiol, 1,2,3-propanetrithiol, 1,2-cyclohexanedithiol, bis(2-mercaptoethyl)ether, tetrakis(mercaptomethyl)methane, diethylene glycol bis(2-mercaptoacetate), diethylene glycol bis(3-mercaptopropionate), ethylene glycol bis(2-mercaptoacetate), ethylene glycol bis(3-mercaptopropionate), trimethylolpropane tris(2-mercaptoacetate), trimethylolpropane tris(3-mercaptopropionate), trimethylolethane tris(2-mercaptoacetate), trimethylolethane tris(3-mercaptopropionate), pentaerythritol tetrakis(2-mercaptoacetate), pentaerythritol tetrakis(3-mercaptopropionate), bis(mercaptomethyl)sulfide, bis(mercaptomethyl)disulfide, bis(mercaptoethyl)sulfide, bis(mercaptoethyl)disulfide, bis(mercaptopropyl)sulfide, bis(mercaptomethylthio)methane, bis(2-mercaptoethylthio)methane, bis(3-mercaptopropylthio)methane, 1,2-bis(mercaptomethylthio)ethane, 1,2-bis(2-mercaptoethylthio)ethane, 1,2-bis(3-mercaptopropylthio)ethane, 1,2,3-tris(mercaptomethylthio)propane, 1,2,3-tris(2-mercaptoethylthio)propane, 1,2,3-tris(3-mercaptopropylthio)propane, 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, tetrakis(mercaptomethylthiomethyl)methane, tetrakis(2-mercaptoethylthiomethyl)methane, tetrakis(3-mercaptopropylthiomethyl)methane, bis(2,3-dimercaptopropyl)sulfide, 2,5-dimercaptomethyl-1,4-dithiane, 2,5-dimercapto-1,4-dithiane, 2,5-dimercaptomethyl-2,5-dimethyl-1,4-dithiane and esters of thioglycolic acid and mercaptopropionic acid, hydroxymethylsulfide bis(2-mercaptoacetate), hydroxymethylsulfide bis(3-mercaptopropionate), hydroxyethylsulfide bis(2-mercaptoacetate), hydroxyethylsulfide bis(3-mercaptopropionate), hydroxymethyldisulfide bis(2-mercaptoacetate), hydroxymethyldisulfide bis(3-mercaptopropionate), hydroxyethyldisulfide bis(2-mercaptoacetate), hydroxyethyldisulfide bis(3-mercaptopropionate), 2-mercaptoethyl ether bis(2-mercaptoacetate), 2-mercaptoethyl ether bis(3-mercaptopropionate), thiodiglycolate bis(2-mercaptoethyl ester), thiodipropionate bis(2-mercaptoethyl ester), dithiodiglycolate bis(2-mercaptoethyl ester), dithiodipropionate bis(2-mercaptoethyl ester), 1,1,3,3-tetrakis(mercaptomethylthio)propane, 1,1,2,2-tetrakis(mercaptomethylthio)ethane, 4,6-bis(mercaptomethylthio)-1,3-dithiacyclohexane, tris(mercaptomethylthio)methane, and tris(mercaptoethylthio)methane;

aromatic polythiol compounds such as 1,2-dimercaptobenzene, 1,3-dimercaptobenzene, 1,4-dimercaptobenzene, 1,2-bis(mercaptomethyl)benzene, 1,3-bis(mercaptomethyl)benzene, 1,4-bis(mercaptomethyl)benzene, 1,2-bis(mercaptoethyl)benzene, 1,3-bis(mercaptoethyl)benzene, 1,4-bis(mercaptoethyl)benzene, 1,3,5-trimercaptobenzene, 1,3,5-tris(mercaptomethyl)benzene, 1,3,5-tris(mercaptomethyleneoxy)benzene, 1,3,5-tris(mercaptoethyleneoxy)benzene, 2,5-toluenedithiol, 3,4-toluenedithiol, 1,5-naphthalenedithiol, and 2,6-naphthalenedithiol; and heterocyclic polythiol compounds such as 2-methylamino-4,6-dithiol-sym-triazine, 3,4-thiophenedithiol, bismuthiol, 4,6-bis(mercaptomethylthio)-1,3-dithiane, and 2-(2,2-bis(mercaptomethylthio)ethyl)-1,3-dithiethane, but are not limited to the exemplary compounds.

In addition, an oligomer of the above active hydrogen compounds or those substituted with halogen such as chlorine and bromine or the like may be used. These active hydrogen compounds may be used alone or in mixture of two or more kinds thereof.

Among these active hydrogen compounds, in view of high availability, cost, performance of the obtained resin, or the like, polythiol compounds are preferably used. For example, pentaerythritol tetrakis(2-mercaptoacetate), pentaerythritol tetrakis(3-mercaptopropionate), bis(mercaptoethyl)sulfide, 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, 2,5-dimercaptomethyl-1,4-dithiane, 1,1,3,3-tetrakis(mercaptomethylthio)propane, 4,6-bis(mercaptomethylthio)-1,3-dithiane and 2-(2,2-bis(mercaptomethylthio)ethyl)-1,3-dithiethane are preferably used, and pentaerythritol tetrakis(3-mercaptopropionate), 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane are particularly preferably used.

Moreover, the (A) isocyanate compound used in the present embodiment may be preliminarily partially reacted with the (B) active hydrogen compound in advance. Additionally, the (B) active hydrogen compound used in the present embodiment may be preliminarily partially reacted with the (A) isocyanate compound in advance.

In addition to the (A) isocyanate compound and (B) active hydrogen compound, in order to modify the resin, a resin modifier such as a hydroxy compound, an epoxy compound, an episulfide compound, an organic acid and its anhydride, and an olefin compound including a (meth)acrylate compound may be added. Herein, the resin modifier is a compound which adjusts or improves physical properties such as a refractive index, an Abbe's number, the heat resistance, and the specific gravity of a thiourethane-based resin, and mechanical strength such as impact strength of the thiourethane-based resin.

Examples of the hydroxy compound that is used as the resin modifier include:

diethylene glycol, triethylene glycol, dipropylene glycol, tripropylene glycol, 1,4-butanediol, thiodiethanol, dithiodiethanol, glycerin, trimethylolpropane, pentaerythritol, and an oligomer thereof, but are not limited to the exemplary compounds.

Examples of the epoxy compound which can be added as the resin modifier include:

phenol-based epoxy compounds which can be obtained by condensation reactions between polyhydric phenol compounds such as bisphenol A glycidyl ether, and epihalohydrin compounds;

alcohol-based epoxy compounds which can be obtained by condensation between polyhydric alcohol compounds such as hydrogenated bisphenol A glycidyl ether, and epihalohydrin compounds;

glycidyl ester-based epoxy compounds which can be obtained by condensation between multivalent organic acid compounds such as 3,4-epoxycyclohexylmethyl-3',4'-epoxycyclohexanecarboxylate, and epihalohydrin compounds;

amine-based epoxy compounds which can be obtained by condensation between primary and secondary diamine compounds and epihalohydrin compounds; and aliphatic multivalent epoxy compounds such as vinylcyclohexenediepoxide, but are not limited to the exemplary compounds.

Examples of the episulfide compound which can be added as the resin modifier include:

2,3-epithiopropylthio compounds of chain aliphatic compounds such as bis(2,3-epithiopropylthio)sulfide, bis(2,3-epithiopropylthio)disulfide, bis(2,3-epithiopropylthio)methane, 1,2-bis(2,3-epithiopropylthio)ethane, and 1,5-bis(2,3-epithiopropylthio)-3-thiapentane;

2,3-epithiopropylthio compounds having alicyclic compounds and heterocyclic rings such as 1,3-bis(2,3-epithiopropylthio)cyclohexane, and 2,5-bis(2,3-epithiopropylthiomethyl)-1,4-dithiane; and aromatic 2,3-epithiopropylthio compounds such as 1,3-bis(2,3-epithiopropylthio)benzene, and 1,4-bis(2,3-epithiopropylthio)benzene, but are not limited to the exemplary compounds.

Examples of the organic acid and anhydride thereof which can be added as the resin modifier include:

thiodiglycolic acid, thiodipropionic acid, dithiodipropionic acid, phthalic anhydride, hexahydrophthalic anhydride, methylhexahydrophthalic anhydride, methyltetrahydrophthalic anhydride, maleic anhydride, trimellitic anhydride, and pyromellitic anhydride, but are not limited to the exemplary compounds.

Examples of the olefin compound which can be added as the resin modifier include:

(meth)acrylate compounds such as benzyl acrylate, benzyl methacrylate, cyclohexyl acrylate, cyclohexyl methacrylate, 2-hydroxyethyl acrylate, 2-hydroxymethyl methacrylate, glycidyl acrylate, glycidyl methacrylate, phenoxyethyl acrylate, phenoxyethyl methacrylate, phenyl methacrylate, ethylene glycol diacrylate, ethylene glycol dimethacrylate, diethylene glycol diacrylate, diethylene glycol dimethacrylate, triethylene glycol diacrylate, triethylene glycol dimethacrylate, neopentyl glycol diacrylate, neopentyl glycol dimethacrylate, ethylene glycol bisglycidyl acrylate, ethylene glycol bisglycidyl methacrylate, bisphenol A diacrylate, bisphenol A dimethacrylate, bisphenol F diacrylate, bisphenol F dimethacrylate, trimethylolpropane triacrylate, trimethylolpropane trimethacrylate, glycerol diacrylate, glycerol dimethacrylate, pentaerythritol triacrylate, pentaerythritol tetracrylate, pentaerythritol tetramethacrylate, xylenedithiol diacrylate, xylenedithiol dimethacrylate, mercaptoethylsulfide diacrylate, and mercaptoethylsulfide dimethacrylate;

allyl compounds such as allylglycidyl ether, diallyl phthalate, diallyl terephthalate, diallyl isophthalate and diethylene glycol bisallylcarbonate; and vinyl compounds such as styrene, chlorostyrene, methylstyrene, bromostyrene, dibromostyrene, divinylbenzene and 3,9-divinylspirobi(m-dioxane), but are not limited to the exemplary compounds.

These resin modifiers may be used alone or in mixture of two or more kinds thereof.

The ratio of the (A) isocyanate compound and the (B) active hydrogen compound (including the hydroxy compounds which are the modifiers) to be used in the present embodiment, in terms of the molar ratio of functional groups (NCO+NCS)/(SH+OH), is normally in a range of 0.8 to 1.5, and preferably in a range of 0.9 to 1.2.

The (A) isocyanate compound and the (B) active hydrogen compound used in the present embodiment are selected considering high availability, cost, high handleability, and performance of the obtained resin, or the like.

The important factor in the high handleability is the viscosity of the mixture during injection. The viscosity during injection is determined by the combination of the (A) isocyanate compound and the (B) active hydrogen compound (when employing the resin modifier, this includes the type and amount of the resin modifier; furthermore, when employing a catalyst, this includes the type and amount of the catalyst), but when the viscosity is too high, the production of the polarized lens becomes difficult since it is difficult to inject into the narrow space portions 24a and 24b located between the glass molds 22a and 22b and the polarized film 12 inside the space of the lens casting mold 20. Typically, the viscosity during injection should be preferably a measurement of 200 mPa·s or less at 20° C., and for producing a lens with very thin central thickness, an even lower viscosity of, for example, 100 mPa·s or less is preferable. The viscosity of the mixture is measured by using a B type viscometer at a solution temperature of 20° C.

As for the performance of the resin to be considered, the refractive index is important, and those having a high refractive index can be used appropriately. For example, a combination of the (A) isocyanate compound and the (B) active hydrogen compound (when employing the resin modifier, this includes the type and amount of the resin modifier), which can obtain a resin having a refractive index typically in a range of 1.57 to 1.70, preferably in a range of 1.59 to 1.70, and more preferably in a range of 1.65 to 1.68 when its refractive index is measured by an e-beam is preferable. If the refractive index is too small, it is believed that the film inside the polarized lens becomes obvious, and the appearance becomes poor.

The same mixture of the (A) isocyanate compound and the (B) active hydrogen compound used in the present embodiment is typically used on both sides of the polarized film, but there is no problem in using different mixtures.

When curing and forming the mixture of the (A) isocyanate compound and the (B) active hydrogen compound, as in the known forming method, materials such as catalysts such as dibutyl tin dichloride, ultraviolet ray absorbing agents such as a benzotriazole-based agent, internal mold releasing agents such as acidic phosphate ester, photostabilizers, antioxidants, reaction initiators such as a radical reaction initiator, chain elongators, cross-linking agents, anticoloring agents, oil-soluble dyes, and fillers may be added, as necessary.

When producing an injection solution by mixing a reaction catalyst, mold releasing agents or other additives with the (A) isocyanate compound and the (B) active hydrogen compound, the adding of the catalyst, the mold releasing agents or other additives are also dependent on the solubility of the (A) isocyanate compound and the (B) active hydrogen compound, but the additives may be added and dissolved in the (A) isocyanate compound in advance, added and dissolved in the (B) active hydrogen compound in advance, or added and dissolved in the mixture of the (A) isocyanate compound and the (B) active hydrogen compound. In addition, there is no problem in dissolving the additive in a part of the (A) isocyanate compound or the (B) active hydrogen compound each used to produce a master solution and then adding the additive to the mixture. The adding order is not limited by the exemplary methods, and is appropriately selected on the basis of operability, safety, convenience, or the like.

Mixing is generally carried out at a temperature of 30° C. or lower. From the viewpoint of the pot life of the mixture, lower temperatures are sometimes preferred. Additionally, when additives such as a catalyst and a mold releasing agent do not exhibit preferable solubility with the (A) isocyanate compound or the (B) active hydrogen compound, they may be heated in advance and then dissolved in the (A) isocyanate compound, the (B) active hydrogen compound, or a mixture thereof.

In addition, depending on the physical properties required for the obtained plastic lens, carrying out a degassing treatment under reduced pressure or a filtration treatment under increased pressure and reduced pressure as necessary may be preferable in many cases.

(e) Step of Polymerization and Curing Mixture and Laminating Layers Including Thiourethane-Based Resin on Both Surfaces of Polarized Film Subsequently, the lens casting mold wherein the polarized film is fixed, into which the mixture of the (A) isocyanate compound and the (B) active hydrogen compound has been injected, is cured and formed inside a heating apparatus, such as in an oven and under water, by a predetermined temperature program for several hours to several tens of hours.

The polymerizing and curing temperature cannot be limited since the conditions differ depending on the composition of the mixture, the type of a catalyst, the shape of a mold, or the like, but it is carried out at a temperature of −50 to 200° C. for 1 to 100 hours.

Typically, it is common to start at a temperature range of 5° C. to 40° C., slowly raising the temperature to a range of 80° C. to 130° C., and then heating at that temperature for 1 hour to 4 hours.

After the completion of the curing and forming, the plastic polarized lens of the present embodiment, as shown in FIG. 1, can be obtained by taking it out of the lens casting mold. In this plastic polarized lens 10, the resin layer 14a, the polarized film 12 and the resin layer 14b are laminated, respectively. Due to this structure, the peel-off of the polarized film 12 from the lens material during the outer circumference polishing process can be suppressed, and the polarized lens can be mass-produced industrially.

In the plastic polarized lens of the present embodiment, it is preferable to heat the released lens for an annealing treatment in order to lessen the strain caused by the polymerization. The annealing temperature is usually in a range of 80 to 150° C., preferably in a range of 100 to 130° C., and more preferably in a range of 110 to 130° C. The annealing time is usually in a range of 0.5 to 5 hours, and preferably in a range of 1 to 4 hours.

The plastic polarized lens of the present embodiment is used having coated layer(s) formed on one surface or both surfaces as necessary. Examples of the coated layers include primer layers, hard coated layers, antireflection film layers, antifog coated layers, antipollutant layers, and water-repellent layers. These coated layers can be each used alone or as multi-layers with plural coated layers. When forming the coated layers on both surfaces, the same coated layer may be formed on each surface, or different coated layers may be formed thereon.

Along with these coated layers, ultraviolet ray absorbing agents for protecting the lens or the eyes from ultraviolet rays, infrared absorbing agents for protecting the eyes from infrared rays, photostabilizers or antioxidants for improving the weathering resistance of the lens, dyes or pigments for the purpose of improving the fashionability of the lens, and photochromic dyes or photochromic pigments, antistatic agents, and other known additives for improving the performance of the lens may be co-opted. Various leveling agents may be used for the purpose of improving the coating characteristics.

The primer layer is generally formed between the polarized lens base material (thiourethane-based resin) and the hard coated layer for the purpose of improving the adhesiveness of the hard coated layer or the impact resistance of the polarized lens, and the film thickness is usually about 0.1 to 10 μm.

The primer layer is, for example, formed by a coating method or a dry method. In the coating method, the primer composition is coated by a well-known coating method such as spin coating, dip coating and the like, and then it is solidified to form a primer layer. In the dry method, it is formed by a known dry method such as the CVD method and a vacuum plating method. When forming the primer layer, pretreatments of the lens surface such as an alkali treatment, a plasma treatment, and an ultraviolet ray treatment for the purpose of improving the adhesiveness may be carried out as necessary.

As the primer composition, materials which provide high adhesiveness between the solidified primer layer and the lens base material (thiourethane-based resin) are preferred, and typically, primer compositions having a urethane-based resin, an epoxy-based resin, a polyester-based resin, a melamine-based resin, and polyvinylacetal as main ingredients are used. The primer composition can be used without a solvent, but an appropriate solvent which does not affect the lens may be used for the purpose of adjusting the viscosity of the composition, and the like.

The hard coated layer is a coated layer which aims to provide the lens surface with functions such as abrasion resistance, wear resistance, moisture resistance, hot water resistance, heat resistance, and weathering resistance, and its layer thickness is usually about 0.3 to 30 μm.

The hard coated layer is typically formed by curing after coating the hard coating composition by known coating methods such as a spin coating method, dip coating method and the like. As the curing method, there are heat curing methods and curing methods by irradiation of energy lines such as ultraviolet rays, visible light and the like. When forming the hard coated layer, pretreatments of the coated surface (the lens base material or the primer layer) such as an alkali treatment, a plasma treatment, and an ultraviolet ray treatment for the purpose of improving the adhesiveness may be carried out as necessary.

As hard coating compositions, in general, the mixture of organic silicone compounds having curability and fine oxide particles (including complex fine oxide particles) of Si, Al, Sn, Sb, Ta, Ce, La, Fe, Zn, W, Zr, In, Ti, or the like is frequently used. Besides these, amines, amino acids, metal acetyl acetonate complexes, organic acid metal salts, perchloric acids, salts of perchloric acids, acids, metal chlorides, multifunctional epoxy compounds, or the like may be used. The hard coating composition can be used without a solvent, but an appropriate solvent which does not affect the lens may be used.

The antireflection layer is typically formed on the hard coated layer as necessary. The antireflection layer may be inorganic-based or organic-based. Generally, the inorganic-based antireflection layer is frequently formed by dry methods such as a vacuum plating method, a sputtering method, an ion plating method, an ion beam assisting method, and a CVD method, which employ inorganic oxides such as $SiO_2$ and $TiO_2$. Generally, the organic-based antireflection layer is frequently formed by a wet method which employs organosilicone compounds and compositions including silica-based fine particles having internal cavities.

The antireflection layer may be a single layered or multi-layered, but when used as a single layer, it is preferable for its refractive index to be lower than the refractive index of the hard coated layer by 0.1 or more. The multi-layered antirefractive layer is preferable in order to effectively realize the antireflection function, and in this case, low refractive index layers and high refractive index layers are typically laminated alternatively. In this case, it is also preferable that the refractive index difference between the low refractive index layer and the high refractive index layer be 0.1 or more. Examples of the high refractive index layer include films of $ZnO$, $TiO_2$, $CeO_2$, $Sb_2O_5$, $SnO_2$, $ZrO_2$, $Ta_2O_5$, or the like, and examples of the low refractive index layer include a $SiO_2$ film. The thickness of the layer is usually about 50 to 150 nm.

In addition, the plastic polarized lens of the present invention may be subjected to rear side polishing, an antistatic treatment, a dye treatment, a light modulation treatment, or the like as necessary.

<Polarized Film>

The polarized film of the present embodiment is a resin film containing an organic coloring compound. Specifically, ones having the same composition as the polarized film 12 used in the plastic polarized lens 10 of the present embodiment can be used. Through this polarized film, it is possible to perceive clearly the color contrast and the outline of an object and the contrast property is improved, and therefore, by using it in the optical applications such as lenses or goggles, the effects of excellent visibility and reduced vision fatigue can be obtained.

The polarized film of the present embodiment can be obtained by the same method as the (a) step in the method of producing the plastic polarized lens of the present embodiment. That is, first, predetermined amounts of a water-insoluble dye containing at least one kind of dichroic dye and an organic coloring compound are added to the predetermined resin and mixed in to obtain a resin composition. Further, after molding the resin composition into a film form by a predetermined method, the obtained film is stretched in a uniaxial direction and then subjected to a heat treatment at a predetermined temperature to produce a polarized film. In the present embodiment, the film thus obtained can also be used as a polarized film.

In addition, as in the present embodiment, when used in a polarized lens having plastic lenses (resin layers) laminated on both sides of the polarized film, it is preferable to carry out the following shaping step (curvature processing) in the polarized film.

The method for curvature processing is not particularly limited, and general press molding, vacuum molding, or the like is used. For the purpose of preventing scratches on the polarized film during the curvature processing, a protective film may be laminated on one surface or both surfaces of the polarized film for processing. The protective film is not particularly limited as long as it does not leave glue when peeled off from the polarized film after the curvature processing.

As the temperature of carrying out the curvature processing, in the case of using a polarized film that has been subjected to an annealing treatment in advance, a temperature range of the crystallization temperature of the resin to lower than the melting temperature is preferred. In the case of using a polarized film that has not been subjected to an annealing treatment, a temperature range of the glass transition temperature of the resin to lower than the melting temperature is preferred. Curvature processing with the polarized film that has not been subjected to an annealing treatment is preferred to perform the annealing treatment after the curvature processing in order to give dimensional stability. Generally, the curvature radius at a time of carrying out the curvature processing is about 40 to 1000 mm.

The temperature for the annealing treatment is preferably in a range of 120° C. to the melting temperature of the resin, considering the situation where a lens is used, particularly the situation where the lens is left in a vehicle.

Further, in the case where a polarized film using a thermoplastic polyester as a resin is used in the polarized lens of the present embodiment, it is preferable to carry out the curvature processing of the thermoplastic polyester film under the temperature conditions of the glass transition temperature of the thermoplastic polyester+20° C. or higher and the glass transition temperature+120° C. or lower, from the viewpoint of adhesiveness to the thiourethane-based resin.

In the case where the plastic polarized film according to the present embodiment is used in a polarized lens, a surface modification treatment may be carried out on at least one surface of the polarized film after carrying out the curvature processing, or an adhesive layer may be provided separately. Otherwise, the surface modification treatment and the formation of the adhesive layer may be carried out in this order. By these, the adhesiveness to a resin layer including the polarized film and the thiourethane-based resin can be improved. Examples of the adhesive layer include layers including a urethane-based resin containing a polyhydroxy compound-derived structural unit and a polyisocyanate-derived structural unit, and examples of the surface modification treatment include a plasma treatment of the film surface.

Further, a polarized lens can be obtained by inserting the polarized film that has been subjected to curvature processing between the two molds holding a gasket, injecting a thermosetting resin, and then molding at a temperature set to a required temperature over several hours to several tens of hours.

By using the polarized film of the present embodiment in the polarized lens, the color contrast or the outline of an object can be perceived clearly and the contrast property is improved, and therefore, the visibility is excellent and the vision fatigue is reduced. In addition, the polarized film of the present embodiment can be developed not only for the lens alone, but also for other contrast-improving applications such as goggles and shields of helmets.

EXAMPLES

Below, the present invention will be described in more detail by way of examples, but is not limited to the present invention. In addition, performance tests on the polarized lens were carried out in the following methods.

(A) Contrast Property

In the outdoors, an object was observed visually through the obtained polarized lens and evaluated based on the following criteria.

A: The outline of the object is clear and the color contrast is high.

B: The outline of the object is unclear and the color contrast is low.

(B) Hue of Lens

The difference in the hues between the central portion and the peripheral portion of the obtained polarized lens in −6D was visually evaluated according to the following criteria.

A: The hues of the central portion and the peripheral portion are the same.

B: The hues of the central portion and the peripheral portion are different.

(C) Adhesiveness of Polarized Film

This is an evaluation which determines whether the adhesiveness between the cured lens material and the polarized film is excellent or not in the polarized lens after the forming.

The test is carried out by striking the obtained lens with a hammer. At this time, if the adhesiveness between the polarized film and the cured lens material is insufficient, peeling off of the polarized film occurs. In other words, by observing the peeling-off state of the laminated portion between the cured lens material of the destroyed lens and the polarized film, and the existence/nonexistence of the peeled-off layer in the destroyed portion, the adhesion state was evaluated by the following criteria.

A: Among the destroyed portions, there are no confirmed positions where the layers are peeled off.

B: Among the destroyed portions, most points are confirmed as not having any peeling off in the layers, but some positions are confirmed as having minute areas of peeling off in the layers.

C: Among the destroyed portions, there are numerous confirmed positions where the layers are peeled off.

(D) Poor Visibility of Polarized Film in Lens

Although the visibility may be evaluated under the light in a normal life environment, in order to simplify the environmental light factors as much as possible, the evaluation was made according to the following method.

In a dark room where other light sources may be neglected, the polarized lens to be tested was placed at a position about 150 cm below a lighted fluorescent lamp with a length of about 120 cm and of 37 watts set above, the image of the fluorescent lamp was observed by looking at the concave surface of the lens from the direction as vertical as possible to the surface, at about 30 cm above the lens, having the lens in the horizontal position with the concave face of the lens turned toward the lamp, while supporting a side face of the lens by hand so that no hindrance existed on both side faces of the lens. In addition, the image was observed while slightly changing the angle of the lens from a horizontal position. Two kinds of clear, large and small images were observed in common, but when the polarized film was conspicuous, another vague image could be observed. Poor visibility of the polarized film was rated according to the following criteria:

A: Almost no vague image is seen.

B: A vague image is slightly seen but not expanded.

C: A vague image fluctuates, and is expanded and conspicuous.

(E) Water Resistance

The polarized lens to be tested was dipped in a constant temperature water bath kept at 60° C., and at each of predetermined intervals, 3 kinds of lenses were taken out and changes were observed. When water-resistance was not sufficient, whitening or discoloration-like deterioration was observed progressing from the peripheral portion to the central portion of the lens with time of dipping (data obtained after 4 hours, 3 days, and 7 days). The length of the deteriorated part from the peripheral portion to the central portion of the lens was measured in millimeters using a vernier caliper.

(F) Refractive Index of Lens Material

Separately, the refractive index at e-line of a piece of a resin (the lens material) molded without the use of the polarized film was measured at 20° C. using a Pulfrich refractometer.

In the present Example, the following raw materials were used.

(Organic Coloring Compound)

Organic coloring compound A: The tetra-t-butyl tetraazaporphyrin-copper complex represented by the formula (2) was used.

(Dichroic Dye)

Dichroic dye A: The dichroic dye represented by the formula (5) was used.

Dichroic dye B: The dichroic dye represented by the formula (6) was used.

Dichroic dye C: The dichroic dye represented by the formula (7) was used.

Dichroic dye D: The dichroic dye represented by the formula (8) was used.

Dichroic dye E: The dichroic dye represented by the formula (9) was used.

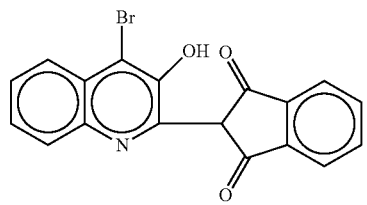

(9)

Dichroic dye F: The dichroic dye represented by the formula (10) was used.

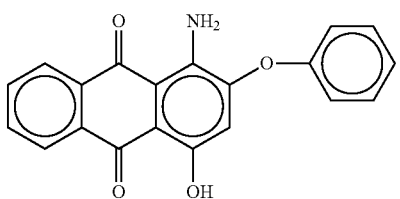

(10)

Dichroic dye G: The dichroic dye represented by the formula (11) was used.

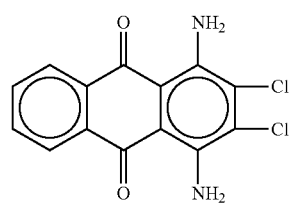

(11)

Dichroic dye H: The dichroic dye represented by the formula (12) was used.

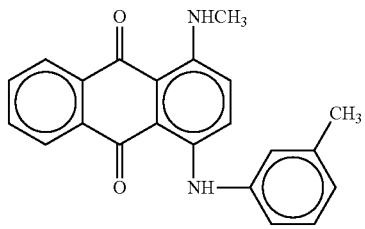
(12)

Example 1

<Preparation of Polarized Film>

0.0150 parts by weight of organic coloring compound A, and suitable blending amounts of the dichroic dyes A to H were prepared to give a desired color tone, and mixed with 100 parts by weight of a polyethylene terephthalate resin. The resin made molten using a T die film molding machine was cast by T die and molded into a film, and the film was subjected to a 4-times stretching operation to obtain a polarized film having a thickness of 140 μm. The polarized film contained 134 ppm of the organic coloring compound A.

<Physical Properties of Polarized Film>

Figure 3:
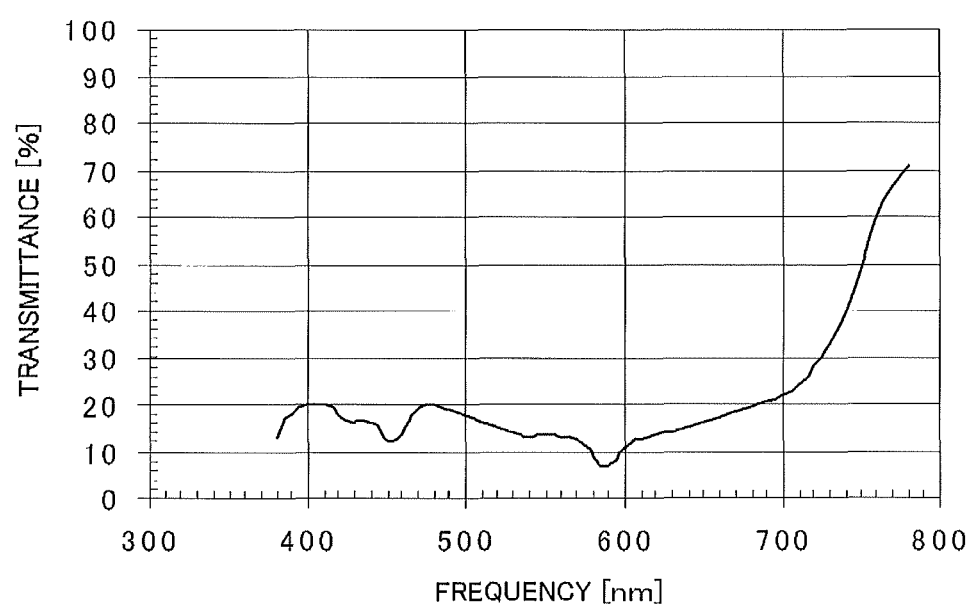
FIG. 3 is a chart showing a transmission spectrum of the polarized film produced in Example 1.

The absorbance of the obtained polarized film was measured using an absorbance measurement device, UV/VIS SPECTROMETER V-550, manufactured by JASCO Inc. The measurement results are shown in FIG. 3. As shown in FIG. 3, there was a peak of maximum absorption at 588 nm. In addition, the polarized film had polarization characteristics.

The glass transition temperature of the polyethylene terephthalate-made polarized film as obtained above, which was provided with an antiglare property was measured by the following manner.

Furthermore, the polarized film was made into a 4.30 mg-cut measurement sample. Using a differential scanning calorimeter DSC-60 manufactured by Shimadzu Corporation, the glass transition temperature was measured by raising the temperature using a heating rate giving a rate of temperature increase of 10° C./min. The glass transition temperature of the polarized film was 70.7° C. (intersection point method) from the inflection point in the chart. In addition, the melting point was 253.8° C. (peak top).

Example 2

<Preparation of Polarized Lens Having Organic Coloring Compound Included in Polarized Film>

The polyethylene terephthalate-made polarized film obtained above in Example 1 [glass transition temperature: 70.7° C.] (thickness 140 μm) was shaped in a curved shape of 2C (curve) at a shaping temperature of 120° C. by a heat pressing method. The polarized film was prepared by cutting the polarized film to match the mold size. This was inserted and installed inside the polarized lens casting mold (glass mold set −5D with a front surface of 2C and a rear surface of 6C) shown in FIG. 2.

On other hand, 50.6 parts by weight of m-xylylene diisocyanate, 49.4 parts by weight of a mixture of 4,8-dimercaptomethyl-1,11-dimercapto-3,6,9-trithiaundecane, 4,7-dimercaptomethyl-1,11-dimercapto-3,6,9-trithiaundecane and 5,7-dimercaptomethyl-1,11-dimercapto-3,6,9-trithiaundecane, 0.01 parts by weight of dibutyl tin dichloride as a curing promoting agent, 0.1 parts by weight of Zelec UN (registered trademark, manufactured by Stepan Company) as a mold releasing agent and 0.05 parts by weight of Seesorb 709 (manufactured by Shipro Kasei Kaisha, Ltd.) as an ultraviolet ray absorbing agent were stirred and dissolved, degassed under reduced pressure, and provided as the monomer mixture for injection right after production. The viscosity at 20° C. after 1 hour of stirring and dissolving was 30 mPa·s. The viscosity of the monomer mixture for injection was measured using a B type viscometer at a liquid temperature of 20° C.

Subsequently, on the two space portions 24a and 24b which are divided by the glass molds 22a and 22b inside the lens casting mold and the polarized film 12, this monomer mixture was passed through a 3 μm filter and filtered, and then passed through the tube for injection. Furthermore, the separated distance "a" of the narrowest space portion 24a, was about 0.5 mm. After the injection, the closed lens casting mold 20 was placed in a hot air circulating oven, heated from 25° C. to 120° C. for 16 hours, and maintained at 120° C. for 4 hours and slowly cooled down, and then the lens casting mold was taken out from the oven. The lens was released from the lens casting mold, subjected to an annealing treatment at 130° C. for 2 hours to obtain a polarized lens.

The performance test results of the obtained polarized lens are shown in Table 1.

The obtained −5D lens had a center thickness of 1.2 mm and a edge thickness of 6.2 mm. When the lens was observed, there was a significant difference in the thickness between the central portion and the peripheral portion, but the color tone of the lens was had almost no change and the lens had good appearance. Further, when observed through the obtained lens, for example, the lines of the branches of the trees under clear sky were very clear or the contrast of green, yellow, and red colors was very high, and the objects could be perceived clearly.

Comparative Example 1

<Preparation of Polarized Lens that does not Contain Organic Coloring Compound>

The polyethylene terephthalate-made polarized film [manufactured by Mitsui Chemicals, Inc.: "POLASOLA (registered trademark)", glass transition temperature: 70.7° C.] (thickness 140 μm) was cut to match the mold size to prepare a polarized film. This was inserted and installed inside the polarized lens casting mold (glass mold set −5D with a front surface of 2C and a rear surface of 6C) shown in FIG. 2.

On other hand, 50.6 parts by weight of m-xylylene diisocyanate, 49.4 parts by weight of a mixture of 4,8-dimercaptomethyl-1,11-dimercapto-3,6,9-trithiaundecane, 4,7-dimercaptomethyl-1,11-dimercapto-3,6,9-trithiaundecane and 5,7-dimercaptomethyl-1,11-dimercapto-3,6,9-trithiaundecane, 0.01 parts by weight of dibutyl tin dichloride as a curing promoting agent, 0.1 parts by weight of Zelec UN (registered trademark, manufactured by Stepan Company) as a mold releasing agent and 0.05 parts by weight of Seesorb 709 (manufactured by Shipro Kasei Kaisha, Ltd.) as an ultraviolet ray absorbing agent were stirred and dissolved, degassed under reduced pressure, and provided as the monomer mixture for injection right after production. The viscosity at 20° C. after 1 hour of stirring and dissolving was 30 mPa·s.

Subsequently, on the two space portions 24a and 24b which are divided by the glass molds 22a and 22b inside the lens casting mold and the polarized film 12, this monomer mixture was passed through a 3 μm filter and filtered, and then passed through the tube for injection. Furthermore, the separated distance "a" of the narrowest space portion 24a, was about 0.5 mm. After the injection, the closed lens casting mold 20 was placed in a hot air circulating oven, heated from 25° C. to 120° C. for 16 hours, and maintained at 120° C. for 4 hours and slowly cooled down, and then the lens casting mold was taken out from the oven. The lens was released from the lens casting mold, subjected to an annealing treatment at 130° C. for 2 hours to obtain a polarized lens.

The performance test results of the obtained polarized lens are shown in Table 1.

The obtained −5D lens had a center thickness of 1.2 mm and a edge thickness of 6.2 mm. As compared with the polarized lens of the present invention using the polarized film containing the organic coloring compound in Example 2, the lines of the branches of the trees under clear sky were not clear or the contrast of green, yellow, and red colors was very high, and the objects could not be perceived clearly.

Comparative Example 2

<Preparation of Polarized Lens that Contains Organic Coloring Compound in Lens Materials> mixture was passed through a 3 μm filter and filtered, and then passed through the tube for injection. Furthermore, the separated distance "a" of the narrowest space portion 24a was about 0.5 mm. After the injection, the closed lens casting mold 20 was placed in a hot air circulating oven, heated from 25° C. to 120° C. for 16 hours, and maintained at 120° C. for 4 hours and slowly cooled down, and then the lens casting mold was taken out from the oven. The lens was released from the lens casting mold, and subjected to an annealing treatment at 130° C. for 2 hours to obtain a polarized lens.

The performance test results of the obtained polarized lens are shown in Table 1.

The obtained −5D lens had a center thickness of 1.2 mm and a edge thickness of 6.2 mm. When observed through the lens, for example, the lines of the branches of the trees under clear sky were very clear or the contrast of green, yellow, and red colors was very high, and the objects could be perceived clearly. However, when the lens itself was observed, there was a difference in the hue between the central portion and the peripheral portion, the color in the central portion is not thick, and thus, the lens had an extremely poor appearance.

TABLE 1

| | Places having organic coloring compound contained therein | Forming temperature (° C.) | Viscosity (mPa · s) at 20° C. after stirring and dissolving for 1 hour | (A) Contrast property | (B) Color of lens | (C) Adhesiveness of polarized film | (D) Poor visibility of polarized film in lens | (E) Water resistance (length (mm) of deteriorated portion from peripheral portion to central portion) | | | (F) Refractive index of lens |
|---|---|---|---|---|---|---|---|---|---|---|---|
| | | | | | | | | After 4 hours | After 3 days | After 7 days | |
| Example 2 | Polarized film | 120 | 30 | A | A | A | A | 0 | 0 | 0 | 1.67 |
| Comparative Example 1 | Not present | 120 | 30 | B | A | A | A | 0 | 0 | 0 | 1.67 |
| Comparative Example 2 | Lens materials | 120 | 30 | A | B | A | A | 0 | 0 | 0 | 1.67 |

The polyethylene terephthalate-made polarized film [manufactured by Mitsui Chemicals, Inc.: "POLASOLA (registered trademark)", glass transition temperature: 70.7° C.] (thickness 140 μm) was cut to match the mold size to prepare a polarized film. This was inserted and installed inside the polarized lens casting mold (glass mold set −5D with a front surface 2C and a rear surface of 6C) shown in FIG. 2.

On other hand, 0.001 parts by weight of an organic coloring compound A was added to 50.6 parts by weight of m-xylylene diisocyanate to give a uniform solution while stirring, 49.4 parts by weight of a mixture of 4,8-dimercaptomethyl-1,11-dimercapto-3,6,9-trithiaundecane, 4,7-dimercaptomethyl-1,11-dimercapto-3,6,9-trithiaundecane and 5,7-dimercaptomethyl-1,11-dimercapto-3,6,9-trithiaundecane, 0.01 parts by weight of dibutyl tin dichloride as a curing promoting agent, 0.1 parts by weight of Zelec UN (registered trademark, manufactured by Stepan Company) as a mold releasing agent and 0.05 parts by weight of Seesorb 709 (manufactured by Shipro Kasei Kaisha, Ltd.) as an ultraviolet ray absorbing agent were stirred and dissolved, degassed under reduced pressure, and provided as the monomer mixture for injection right after production. The viscosity at 20° C. after 1 hour of stirring and dissolving was 30 mPa·s.

Subsequently, on the two space portions 24a and 24b which are divided by the glass molds 22a and 22b inside the lens casting mold and the polarized film 12, this monomer Example 3

The polyethylene terephthalate-made polarized film obtained above in Example 1 [glass transition temperature: 70.7° C.] (thickness 140 μm) was subjected to a heating treatment in an oven at 140° C. for 15 minutes in advance, and then shaped in a curved shape of 6C (curve) at a shaping temperature of 160° C. by a heat pressing method. The polarized film was cut to match the mold size, and then the surface and the back surface of the polarized film were irradiated with plasma for 20 seconds, respectively, using a surface modification device by irradiation with plasma (PS-601 SW type: manufactured by Wedge Co., Ltd.), washed with methanol, and then air-dried. This was inserted and installed inside the polarized lens casting mold (glass mold set with a front surface of 6C and a rear surface of 6C, center thickness: 12 mm). Further, in the same manner as in Example 2, the monomer mixture for injection was injected, warmed from 25° C. to 100° C. in an oven over 16 hours, and then kept at 100° C. for 10 hours and gradually cooled. Then, the lens casting mold was taken out from the oven. The lens was released from the lens casting mold, and annealed at 115° C. for 2 hours to obtain a polarized lens in a semi-finished lens shape. Thereafter, the rear surface was cut and polished to give a lens having a −6D shape.

The obtained −6D lens had a center thickness of 1.2 mm and a edge thickness of 9.0 mm. The performance test results of the polarized lens are shown in Table 2. The adhesiveness between the lens and the polarized film was good, and deformation such as strain could not be seen.

When the lens was observed, there was a significant difference in the thickness between the central portion and the peripheral portion, but there was almost no change in the color tone of the lens and the lens had good appearance. Further, when observed through the obtained lens, for example, the lines of the branches of the trees under clear sky were very clear or the contrast of green, yellow, and red colors was very high, and the objects could be perceived clearly.

Example 4

The polarized film was prepared by shaping and cutting the film in the same manner as in Example 3 except that the shaping temperature by heat pressing of the polarized film was set to 140° C. to form a curved shape of 2C (curve), and subjecting the surface and the back surface of the polarized film to a corona discharge treatment in a 400 W set using a corona discharge surface treatment device (CTW-0212 type: manufactured by Wedge Co., Ltd.).

Therefore, in the same manner as in Example 3, this was inserted and installed inside the polarized lens casting mold (glass mold set with a front surface of 2C and a rear surface of 4C, center thickness: 10 mm). Further, in the same manner as in Example 3, the monomer mixture was injected and subjected to a heating treatment and curing in an oven, and gradually cooled. Then, the lens was released from the lens casting mold and annealed to obtain a polarized lens in a semi-finished lens shape. Thereafter, the rear surface was cut and polished to give a lens having a −3D shape. The obtained −3D lens had a center thickness of 1.2 mm and a edge thickness of 3.6 mm. The performance test results of the polarized lens are shown in Table 2. The adhesiveness between the lens and the polarized film was good, and deformation such as strain could not be seen.

When the lens was observed, there was a significant difference in the thickness between the central portion and the peripheral portion, but there was almost no change in the color tone of the lens and the lens had good appearance. Further, when observed through the obtained lens, for example, the lines of the branches of the trees under clear sky were very clear or the contrast of green, yellow, and red colors was very high, and the objects could be perceived clearly.

Example 5

The polarized film formed by shaping and cutting the polarized film in the same manner as in Example 3 except that the shaping temperature by heat pressing of the polarized film was set to 140° C. to form a curved shape of 4C (curve) was washed with methanol and dried at 40° C. This film was dipped in an acryl-based adhesive solution (SYNEDOL2263XB coating solution manufactured by CHEMISCHE INDUSTRIE SYNRES NV. (HOLLAND)), taken out, then dried at 40° C., and subjected to an acryl-based coating treatment.

Thereafter, in the same manner as in Example 3, this was inserted and installed inside the polarized lens casting mold (glass mold set with a front surface of 4C and a rear surface 6C, center thickness: 11 mm). Further, in the same manner as in Example 3, the monomer mixture was injected and subjected to a heating treatment and curing in an oven, and gradually cooled. Then, the lens was released from the lens casting mold and annealed to obtain a polarized lens in a semi-finished lens shape. Thereafter, the rear surface was cut and polished to give a lens having a −5D shape. The obtained −5D lens had a center thickness of 1.2 mm and a edge thickness of 6.6 mm. The performance test results of the polarized lens are shown in Table 2. The adhesiveness between the lens and the polarized film was good, and deformation such as strain could not be seen.

When the lens was observed, there was a significant difference in the thickness between the central portion and the peripheral portion, but there was almost no change in the color tone of the lens and the lens had good appearance. Further, when observed through the obtained lens, for example, the lines of the branches of the trees under clear sky were very clear or the contrast of green, yellow, and red colors was very high, and the objects could be perceived clearly.

Example 6

As a urethane-based coating, 100 parts by weight of SANPLENE IB-422 (polyester-based polyurethane resin solution, manufactured by Sanyo Chemical Industries, Ltd.) was dissolved in 330 parts by weight of a mixture solvent with a weight ratio of 2:1 of methyl ethyl ketone and isopropanol, and the urethane-based coating solution was produced.

The polarized film before shaping by heat pressing was maintained mostly horizontally while coating the surface of the film with the above-described urethane-based coating solution that had been prepared in advance using a #4 bar coater, and then dried in a blower dry oven at 50° C. for 5 minutes. Subsequently, the other surface of the obtained film was peeled and the coating solution was coated and dried in the same method as above.

The polarized film that had been urethane-coated was shaped in a curved shape of 6C (curves) at a shaping temperature of 140° C. by a heat pressing method.

Thereafter, in the same manner as in Example 3, this was inserted and installed inside the polarized lens casting mold (glass mold set with a front surface of 6C and a rear surface of 6C, center thickness: 12 mm). Further, in the same manner as in Example 3, the monomer mixture was injected and subjected to a heating treatment and curing in an oven, and gradually cooled. Then, the lens was released from the lens casting mold and annealed to obtain a polarized lens in a semi-finished lens shape. Thereafter, the rear surface was cut and polished to give a lens having a −6D shape. The obtained −6D lens had a center thickness of 1.2 mm and a edge thickness of 9.0 mm. The performance test results of the polarized lens are shown in Table 2. The adhesiveness between the lens and the polarized film was good, and deformation such as strain could not be seen.

When the lens was observed, there was a significant difference in the thickness between the central portion and the peripheral portion, but there was almost no change in the color tone of the lens and the lens had good appearance. Further, when observed through the obtained lens, for example, the lines of the branches of the trees under clear sky were very clear or the contrast of green, yellow, and red colors was very high, and the objects could be perceived clearly.

Example 7

The surface and the back surface of the polarized film formed by shaping and cutting the polarized film in the same manner as in Example 3 except that the shaping temperature by heat pressing of the polarized film was set to 140° C. to form a curved shape of 6C (curve) were irradiated with plasma for 20 seconds, respectively, using a surface modification device by irradiation with plasma (PS-601 SW type: manufactured by Wedge Co., Ltd.), washed with methanol, and then dried at 40° C. This film was dipped in an acryl-based adhesive solution (SYNEDOL2263XB coating solution manufactured by CHEMISCHE INDUSTRIE SYNRES NV. (HOLLAND)), taken out, then dried at 40° C., and subjected to an acryl-based coating treatment.

Thereafter, in the same manner as in Example 3, this was inserted and installed inside the polarized lens casting mold (glass mold set with a front surface of 6C and a rear surface 6C, center thickness: 12 mm). Further, in the same manner as in Example 3, the monomer mixture was injected and subjected to a heating treatment and curing in an oven, and gradually cooled. Then, the lens was released from the lens casting mold and annealed to obtain a polarized lens in a semi-finished lens shape. Thereafter, the rear surface was cut and polished to give a lens having a −6D shape. The obtained −6D lens had a center thickness of 1.2 mm and a edge thickness of 9.0 mm. The performance test results of the polarized lens are shown in Table 2. The adhesiveness between the lens and the polarized film was good, and deformation such as strain could not be seen.

When the lens was observed, there was a significant difference in the thickness between the central portion and the peripheral portion, but there was almost no change in the color tone of the lens and the lens had good appearance. Further, when observed through the obtained lens, for example, the lines of the branches of the trees under clear sky were very clear or the contrast of green, yellow, and red colors was very high, and the objects could be perceived clearly.

Example 8

The polarized film was prepared by shaping and cutting the film in the same manner as in Example 3 except that the shaping temperature by heat pressing of the polarized film was set to 140° C. to form a curved shape of 6C (curve), and the surface and the back surface of the polarized film were subjected to a corona discharge treatment in a 400 W set using a corona discharge surface treatment device (CTW-0212 type: manufactured by Wedge Co., Ltd.). This film was dipped in an acryl-based adhesive solution (SYNEDOL2263XB coating solution manufactured by CHEMISCHE INDUSTRIE SYNRES NV. (HOLLAND)), taken out, then dried at 40° C., and subjected to an acryl-based coating treatment.

Thereafter, in the same manner as in Example 3, this was inserted and installed inside the polarized lens casting mold (glass mold set with a front surface of 6C and a rear surface of 6C, center thickness: 12 mm). Further, in the same manner as in Example 3, the monomer mixture for injection was injected, warmed from 25° C. to 115° C. in an oven over 16 hours, and then kept at 115° C. for 10 hours and gradually cooled. Then, the lens casting mold was taken out from the oven. The lens was released from the lens casting mold, and annealed at 115° C. for 2 hours to obtain a polarized lens having a semi-finished lens shape.

After the heat treatment and curing, and then slowly cooling, the lens was released from the lens casing mold and annealed to obtain a polarized lens in a semi-finished lens shape. Thereafter, the rear surface was cut and polished to give a lens having a −6D shape. The obtained −6D lens had a center thickness of 1.2 mm and a edge thickness of 9.0 mm. The performance test results of the polarized lens are shown in Table 2. The adhesiveness between the lens and the polarized film was good, and deformation such as strain could not be seen.

When the lens was observed, there was a significant difference in the thickness between the central portion and the peripheral portion, but there was almost no change in the color tone of the lens and the lens had good appearance. Further, when observed through the obtained lens, for example, the lines of the branches of the trees under clear sky were very clear or the contrast of green, yellow, and red colors was very high, and the objects could be perceived clearly.

TABLE 2

| | Polarized film in the curve shape | Forming temperature (° C.) | Surface modification treatment | Strain or deformation of lens | (A) Contrast property | (B) Hue of lens | (C) Adhesiveness of polarized film | (D) Poor visibility of polarized film in lens | (E) Water resistance (length (mm) of deteriorated portion from peripheral portion to central portion) | | | (F) Refractive index of lens |
|---|---|---|---|---|---|---|---|---|---|---|---|---|
| | | | | | | | | | After 4 hours | After 3 days | After 7 days | |
| Example 3 | 6C | 160 | Plasma treatment | No strain No deformation | A | A | A | A | 0 | 0 | 0 | 1.67 |
| Example 4 | 2C | 140 | Corona discharge treatment | No strain No deformation | A | A | A | A | 0 | 0 | 0 | 1.67 |
| Example 5 | 4C | 140 | Acryl-based coating | No strain No deformation | A | A | A | A | 0 | 0 | 0 | 1.67 |
| Example 6 | 6C | 140 | Urethane-based coating | No strain No deformation | A | A | A | A | 0 | 0 | 0 | 1.67 |
| Example 7 | 6C | 140 | Plasma treatment Acryl-based coating | No strain No deformation | A | A | A | A | 0 | 0 | 0 | 1.67 |
| Example 8 | 6C | 140 | Corona discharge treatment Acryl-based coating | No strain No deformation | A | A | A | A | 0 | 0 | 0 | 1.67 |

The present invention may include the embodiments below.

(a1) A plastic polarized lens with a high contrast property, in which the layers including a thiourethane-based resin containing a thermoplastic polyester are laminated on both surfaces of the polarized film, wherein the polarized film contains an organic coloring compound represented by the following general formula (1):

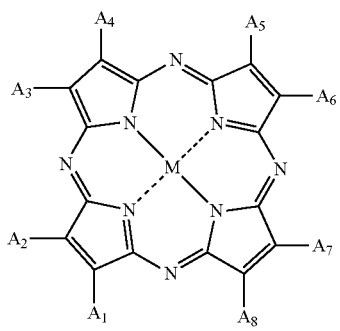

(1)

wherein $A_1$ to $A_8$ each independently represent a hydrogen atom, a halogen atom, a nitro group, a cyano group, a hydroxy group, an amino group, a carboxyl group, a sulfone group, a linear, branched, or cyclic alkyl group having 1 to 20 carbon atoms, an alkoxy group having 1 to 20 carbon atoms, an aryloxy group having 6 to 20 carbon atoms, a monoalkylamino group having 1 to 20 carbon atoms, a dialkylamino group having 2 to 20 carbon atoms, an aralkyl group having 7 to 20 carbon atoms, an aryl group having 6 to 20 carbon atoms, a heteroaryl group, an alkylthio group having 1 to 20 carbon atoms, or an arylthio group having 1 to 20 carbon atoms, or may form a ring other than an aromatic ring through a linking group, and M represents two hydrogen atoms, a divalent metal atom, a trivalent mono-substituted metal atom, a tetravalent di-substituted metal atom, or an oxy metal.

(a2) The plastic polarized lens with a high contrast property as described in (a1), wherein the organic coloring compound is represented by the following general formula (1a):

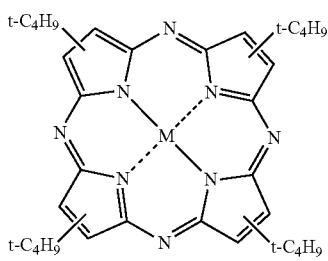

(1a)

wherein $t$-$C_4H_9$ represents a tertiary butyl group, four tertiary butyl groups correspond to $A_1$ or $A_2$, $A_3$ or $A_4$, $A_5$ or $A_6$, and $A_7$ or $A_8$, respectively, in the formula (1), and represent a position isomer structure, four groups that are not tertiary butyl groups in $A_1$ to $A_8$ represent a hydrogen atom. M represents a divalent copper atom, a divalent palladium atom, or divalent vanadium oxide (—V(═O)—).

(a3) The plastic polarized lens with a high contrast property as described in (a1) or (a2), wherein the organic coloring compound is contained in the amount of 50 to 7000 ppm in the polarized film.

(a4) The plastic polarized lens with a high contrast property as described in any one of (a1) to (a3), wherein the thiourethane-based resin is obtained by reacting (A) at least one kind of isocyanate compounds selected from the group consisting of a polyisocyanate compound, an isocyanate compound having an isothiocyanate group, and a polyisothiocyanate compound with (B) at least one kind of active hydrogen compounds selected from the group consisting of thiol compounds and polythiol compounds having a hydroxy group.

(a5) The plastic polarized lens with a high contrast property as described in any one of (a1) to (a4), wherein the polarized film is shaped under the condition of the temperature T1 represented by the following formula:

Glass transition temperature of the thermoplastic polyester+20° C.≤$T1$≤Glass transition temperature of the thermoplastic polyester+120° C.  (Formula)

(a6) The plastic polarized lens with a high contrast property as described in any one of (a1) to (a5), wherein the formation or surface modification treatment of the adhesive layer is carried on at least one surface of the polarized film.

(a7) The plastic polarized lens with a high contrast property as described in any one of (a1) to (a6), wherein the thermoplastic polyester is a polyethylene terephthalate.

(a8) The plastic polarized lens with a high contrast property as described in any one of (a4) to (a7), wherein the isocyanate compound (A) is a diisocyanate compound and the active hydrogen compound (B) is a polythiol compound.

(a9) The plastic polarized lens with a high contrast property as described in any one of (a4) to (a8), wherein the isocyanate compound (A) is at least one kind of diisocyanate compound selected from the group consisting of 2,5-bis(isocyanatomethyl)bicyclo-[2.2.1]-heptane, 2,6-bis(isocyanatomethyl)bicyclo-[2.2.1]-heptane, and m-xylylene diisocyanate, and the active hydrogen compound (B) is at least one kind of polythiol compound selected from the group consisting of pentaerythritoltetrakis(3-mercaptopropionate), 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane.

(a10) The plastic polarized lens with a high contrast property as described in any one of (a1) to (a9), wherein the refractive index at e-line of the thiourethane-based resin is in a range of 1.57 to 1.70.

(a11) The plastic polarized lens with a high contrast property as described in any one of (a1) to (a9), wherein the refractive index at e-line of the thiourethane-based resin is in a range of 1.59 to 1.70.

(a12) A method of producing a plastic polarized lens with a high contrast property, including:

producing a thermoplastic polyester film containing an organic coloring compound represented by the following general formula (1), shaping the thermoplastic polyester film under the temperature condition of the glass transition temperature of the thermoplastic polyester+20° C. or higher and the glass transition temperature+120° C. or lower to obtain a polarized film, fixing the polarized film in a lens casting mold in a state in which the polarized film is apart from the mold, injecting a monomer mixture into the space between both surfaces of the polarized film and the mold, and stacking layers comprising a thiourethane-based resin over both surfaces of the polarized film by polymerizing and curing the monomer mixture.

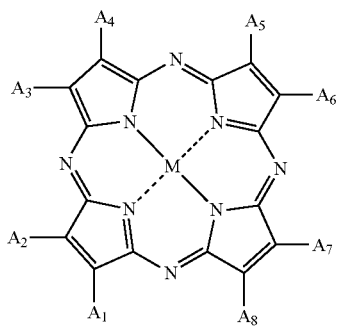
(1)

wherein $A_1$ to $A_8$ each independently represent a hydrogen atom, a halogen atom, a nitro group, a cyano group, a hydroxy group, an amino group, a carboxyl group, a sulfone group, a linear, branched, or cyclic alkyl group having 1 to 20 carbon atoms, an alkoxy group having 1 to 20 carbon atoms, an aryloxy group having 6 to 20 carbon atoms, a monoalkylamino group having 1 to 20 carbon atoms, a dialkylamino group having 2 to 20 carbon atoms, an aralkyl group having 7 to 20 carbon atoms, an aryl group having 6 to 20 carbon atoms, a heteroaryl group, an alkylthio group having 1 to 20 carbon atoms, or an arylthio group having 1 to 20 carbon atoms, or may form a ring other than an aromatic ring through a linking group, and M represents two hydrogen atoms, a divalent metal atom, a trivalent mono-substituted metal atom, a tetravalent di-substituted metal atom, or an oxy metal.

(a13) The method of producing a plastic polarized lens with a high contrast property as described in (a12), wherein the organic coloring compound is represented by the following general formula (1a):

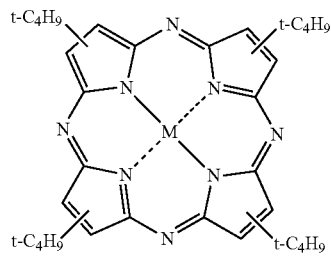
(1a)

wherein $t\text{-}C_4H_9$ represents a tertiary butyl group. Four tertiary butyl groups correspond to $A_1$ or $A_2$, $A_3$ or $A_4$, $A_5$ or $A_6$, and $A_7$ or $A_8$, respectively, in the formula (1), and represent a position isomer structure. Further, four groups that are not tertiary butyl groups in $A_1$ to $A_8$ represent a hydrogen atom. M represents a divalent copper atom, a divalent palladium atom, or divalent vanadium oxide (—V(=O)—).

(a14) The method of producing a plastic polarized lens with a high contrast property as described in (a12) or (a13), wherein the monomer mixture includes:

(A) at least one kind of isocyanate compounds selected from the group consisting of a polyisocyanate compound, an isocyanate compound having an isothiocyanate group, and a polyisothiocyanate compound, (B) at least one kind of active hydrogen compound selected from the group consisting of thiol compounds and polythiol compounds having a hydroxy group.

(a15) The method of producing a plastic polarized lens with a high contrast property as described in any one of (a12) to (a14), including:
subjecting at least one surface of the polarized film to a surface modification treatment before the fixing the polarized film.

(a16) The method of producing a plastic polarized lens with a high contrast property as described in any one of (a12) to (a15), including:
forming an adhesive layer on at least one surface of the polarized film before the fixing the polarized film.

(a17) The method of producing a plastic polarized lens with a high contrast property as described in any one of (a12) to (a14), including:
subjecting at least one surface of the polarized film to a surface modification treatment, and
forming an adhesive layer on the surface that has been subjected to a surface modification treatment,
before the fixing the polarized film.

(a18) The method of producing a plastic polarized lens with a high contrast property as described in any one of (a12) to (a17), wherein the thermoplastic polyester is a polyethylene terephthalate.

(a19) The method of producing a plastic polarized lens with a high contrast property as described in any one of (a14) to (a18),
wherein the isocyanate compound (A) is a diisocyanate compound and the active hydrogen compound (B) is a polythiol compound.

(a20) The method of producing a plastic polarized lens with a high contrast property as described in any one of (a14) to (a19), wherein the isocyanate compound (A) is at least one kind of diisocyanate compounds selected from the group consisting of 2,5-bis(isocyanatomethyl)bicyclo-[2.2.1]-heptane, 2,6-bis(isocyanatomethyl)bicyclo-[2.2.1]-heptane, and m-xylylene diisocyanate, and
the active hydrogen compound (B) is at least one kind of polythiol compounds selected from the group consisting of pentaerythritoltetrakis(3-mercaptopropionate), 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane.

(a21) The method of producing a plastic polarized lens with a high contrast property as described in any one of (a14) to (a20), wherein the viscosity at 20° C. of the monomer mixture is 200 mPa·s or less in the injecting step.

(a22) A polarized film including a thermoplastic polyester containing an organic coloring compound represented by the following general formula (1):

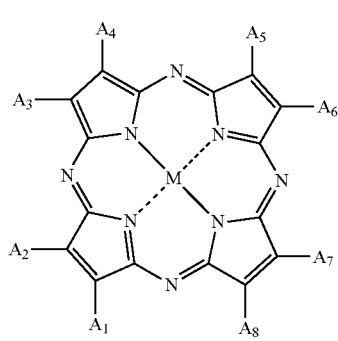
(1)

$A_1$ wherein to $A_8$ each independently represent a hydrogen atom, a halogen atom, a nitro group, a cyano group, a hydroxy group, an amino group, a carboxyl group, a sulfone group, a linear, branched, or cyclic alkyl group having 1 to 20 carbon atoms, an alkoxy group having 1 to 20 carbon atoms, an aryloxy group having 6 to 20 carbon atoms, a monoalkylamino group having 1 to 20 carbon atoms, a dialkylamino group having 2 to 20 carbon atoms, an aralkyl group having 7 to 20 carbon atoms, an aryl group having 6 to 20 carbon atoms, a heteroaryl group, an alkylthio group having 1 to 20 carbon atoms, or an arylthio group having 1 to 20 carbon atoms, or may form a ring other than an aromatic ring through a linking group, and M represents two hydrogen atoms, a divalent metal atom, a trivalent mono-substituted metal atom, a tetravalent di-substituted metal atom, or an oxy metal.

(a23) The polarized film as described in (a22), wherein the organic coloring compound is represented by the following general formula (1a):

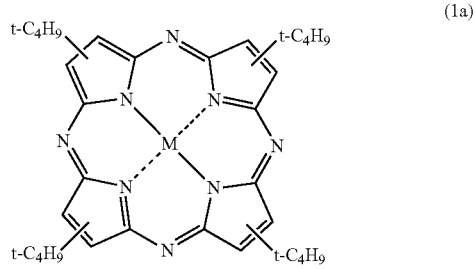

(1a)

wherein t-$C_4H_9$ represents a tertiary butyl group. Four tertiary butyl groups correspond to $A_1$ or $A_2$, $A_3$ or $A_4$, $A_5$ or $A_6$, and $A_7$ or $A_8$, respectively, in the formula (1), and represent a position isomer structure. Further, four groups that are not tertiary butyl groups in $A_1$ to $A_8$ represent a hydrogen atom. M represents a divalent copper atom, a divalent palladium atom, or divalent vanadium oxide (—V(=O)—).

(a24) The polarized film as described in (a22) or (a23), wherein the organic coloring compound is contained in the amount of 50 to 7000 ppm in the polarized film.

(a25) The polarized film as described in any one of (a22) to (a24), wherein the thermoplastic polyester is a polyethylene terephthalate.

(a26) The polarized film as described in any one of (a22) to (a25), which is used in the plastic polarized lens with a high contrast property as described in any one of (a1) to (a11).

(a27) A method for producing the polarized film as described in (a26), including:

producing a thermoplastic polyester film containing the organic coloring compound, and shaping the thermoplastic polyester film under the temperature condition of the glass transition temperature of the thermoplastic polyester+20° C. or higher and the glass transition temperature+120° C. or lower.

The invention claimed is:

1. A plastic polarized lens comprising:

a polarized film and layers comprising a thiourethane-based resin stacked over both surfaces of the polarized film, wherein the polarized film contains a dichroic dye and an organic coloring compound represented by the following general formula (1):

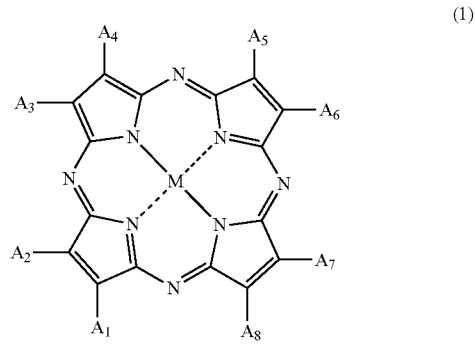

(1)

wherein $A_1$ to $A_8$ each independently represent a hydrogen atom, a halogen atom, a nitro group, a cyano group, a hydroxy group, an amino group, a carboxyl group, a sulfone group, a linear, branched, or cyclic alkyl group having 1 to 20 carbon atoms, an alkoxy group having 1 to 20 carbon atoms, an aryloxy group having 6 to 20 carbon atoms, a monoalkylamino group having 1 to 20 carbon atoms, a dialkylamino group having 2 to 20 carbon atoms, an aralkyl group having 7 to 20 carbon atoms, an aryl group having 6 to 20 carbon atoms, a heteroaryl group, an alkylthio group having 1 to 20 carbon atoms, or an arylthio group having 1 to 20 carbon atoms, or may form a ring other than an aromatic ring through a linking group, and M represents two hydrogen atoms, a divalent metal atom, a trivalent mono-substituted metal atom, a tetravalent di-substituted metal atom, or an oxy metal.

2. The plastic polarized lens according to claim 1, wherein the organic coloring compound is represented by the following general formula (1 a):

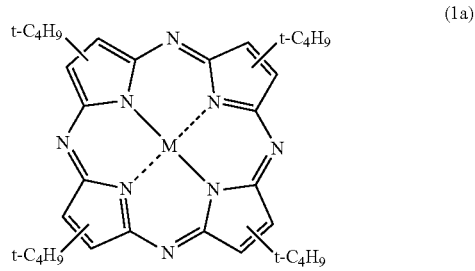

(1a)

wherein t-$C_4H_9$ represents a tertiary butyl group, four tertiary butyl groups correspond to $A_1$ or $A_2$, $A_3$ or $A_4$, $A_5$ or $A_6$, and $A_7$ or $A_8$, respectively in the formula (1), and represent a position isomer structure, four groups that are not tertiary butyl groups in $A_1$ to $A_8$ represent a hydrogen atom; M represents a divalent copper atom, a divalent palladium atom, or divalent vanadium oxide (—V(=O)—).

3. The plastic polarized lens according to claim 1, wherein the polarized film is comprised of a thermoplastic polyester.

4. The plastic polarized lens according to claim 3, wherein the polarized film is shaped under the condition of the temperature T1 represented by the following formula:

Glass transition temperature of the thermoplastic polyester+20° C.≤T1≤Glass transition temperature of the thermoplastic polyester+120° C.

5. The plastic polarized lens according to claim 3, wherein the thermoplastic polyester is a polyethylene terephthalate.

6. The plastic polarized lens according to claim 1, wherein the oranic coloring compound is contained in the amount of 50 to 7000 ppm and the dichroic dye is contained in the amount of 0.005 parts by weight to 4 parts by weight with respect to 100 parts by weight of the resin in the polarized film.

7. The plastic polarized lens according to claim 1, wherein the thiourethane-based resin is obtained by reacting
(A) at least one kind of isocyanate compounds selected from the group consisting of a polyisocyanate compound, an isocyanate compound having an isothiocyanate group, and a polyisothiocyanate compound with
(B) at least one kind of active hydrogen compounds selected from the group consisting of thiol compounds and polythiol compounds having a hydroxy group.

8. The plastic polarized lens according to claim 7, wherein the isocyanate compound (A) is a diisocyanate compound and the active hydrogen compound (B) is a polythiol compound.

9. The plastic polarized lens according to claim 7, wherein the isocyanate compound (A) is at least one kind of diisocyanate compound selected from the group consisting of 2,5-bis(isocyanatomethyl)bicyclo-[2.2.1]-heptane, 2,6-bis(isocyanatomethyl)bicyclo-[2.2.1]-heptane, and m-xylylene diisocyanate, and
the active hydrogen compound (B) is at least one kind of polythiol compound selected from the group consisting of pentaerythritoltetrakis(3-mercaptopropionate), 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane.

10. The plastic polarized lens according to claim 1, further comprising the adhesive layer on at least one surface of the polarized film.

11. The plastic polarized lens according to claim 1, wherein the refractive index at e-line of the thiourethane-based resin is in a range of 1.57 to 1.70.

12. The plastic polarized lens according to claim 1, wherein the refractive index at e-line of the thiourethane-based resin is in a range of 1.59 to 1.70.

13. A method of producing a plastic polarized lens, comprising:
producing a resin film containing an organic coloring compound represented by the following general formula (1) and a dichroic dye;
shaping the resin film to obtain a polarized film;
fixing the polarized film in a lens casting mold in a state in which the polarized film is apart from the mold;
injecting a monomer mixture into the space between both surfaces of the polarized film and the mold; and
stacking layers comprising a thiourethane-based resin over both surfaces of the polarized film by polymerizing and curing the monomer mixture:

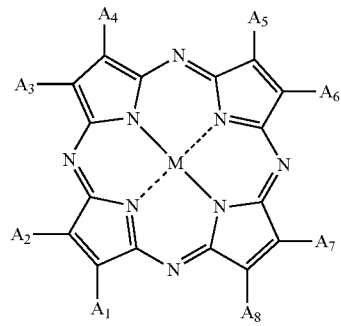

(1)

wherein $A_1$ to $A_8$ each independently represent a hydrogen atom, a halogen atom, a nitro group, a cyano group, a hydroxy group, an amino group, a carboxyl group, a sulfone group, a linear, branched, or cyclic alkyl group having 1 to 20 carbon atoms, an alkoxy group having 1 to 20 carbon atoms, an aryloxy group having 6 to 20 carbon atoms, a monoalkylamino group having 1 to 20 carbon atoms, a dialkylamino group having 2 to 20 carbon atoms, an aralkyl group having 7 to 20 carbon atoms, an aryl group having 6 to 20 carbon atoms, a heteroaryl group, an alkylthio group having 1 to 20 carbon atoms, or an arylthio group having 1 to 20 carbon atoms, or may form a ring other than an aromatic ring through a linking group, and M represents two hydrogen atoms, a divalent metal atom, a trivalent mono-substituted metal atom, a tetravalent di-substituted metal atom, or an oxy metal.

14. The method of producing a plastic polarized lens according to claim 13, wherein the organic coloring compound is represented by the following general formula (1a):

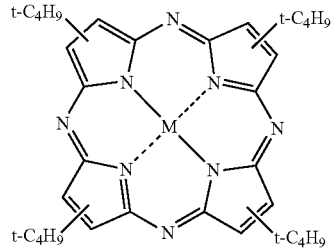

(1a)

wherein $t-C_4H_9$ represents a tertiary butyl group, four tertiary butyl groups correspond to $A_1$ or $A_2$, $A_3$ or $A_4$, $A_5$ or $A_6$, and $A_7$ or $A_8$, respectively, in the formula (1), and represent a position isomer structure, four groups that are not tertiary butyl groups in $A_1$ to $A_8$ represent a hydrogen atom; M represents a divalent copper atom, a divalent palladium atom, or divalent vanadium oxide (—V(=O)—).

15. The method of producing a plastic polarized lens according to claim 13, wherein the resin film is a thermoplastic polyester film.

16. The method of producing a plastic polarized lens according to claim 15, wherein the step of shaping the resin film includes:
shaping the thermoplastic polyester film under the temperature condition of the glass transition temperature of the thermoplastic polyester+20° C. or higher and the glass transition temperature+120° C. or lower.

17. The method of producing a plastic polarized lens according to claim 15, wherein the thermoplastic polyester is a polyethylene terephthalate.

18. The method of producing a plastic polarized lens according to claim 13, wherein the monomer mixture includes:
(A) at least one kind of isocyanate compounds selected from the group consisting of a polyisocyanate compound, an isocyanate compound having an isothiocyanate group, and a polyisothiocyanate compound,
(B) at least one kind of active hydrogen compound selected from the group consisting of thiol compounds and polythiol compounds having a hydroxy group.

19. The method of producing a plastic polarized lens according to claim 18, wherein the isocyanate compound (A) is a diisocyanate compound and the active hydrogen compound (B) is a polythiol compound.

20. The method of producing a plastic polarized lens according to claim 18, wherein the isocyanate compound (A) is at least one kind of diisocyanate compounds selected from the group consisting of 2,5-bis(isocyanatomethyl)bicyclo-[2.2.1]-heptane, 2,6-bis(isocyanatomethyl)bicyclo-[2.2.1]-heptane, and m-xylylene diisocyanate, and
the active hydrogen compound (B) is at least one kind of polythiol compounds selected from the group consisting of pentaerythritoltetrakis(3-mercaptopropionate), 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane.

21. The method of producing a plastic polarized lens according to claim 13, further comprising:
subjecting at least one surface of the polarized film to a surface modification treatment before the fixing the polarized film.

22. The method of producing a plastic polarized lens according to claim 13, further comprising:
forming an adhesive layer over at least one surface of the polarized film before the fixing the polarized film.

23. The method of producing a plastic polarized lens according to claim 13, further comprising:
subjecting at least one surface of the polarized film to a surface modification treatment; and
forming an adhesive layer over the surface that has been subjected to a surface modification treatment,
before the fixing the polarized film.

24. The method of producing a plastic polarized lens according to claim 13, wherein the viscosity at 20° C. of the monomer mixture is 200 mPa·s or less in the injecting step.

25. The method of producing a plastic polarized lens according to claim 13, wherein the dichroic dye is represented by the following formulae (5) to (12):

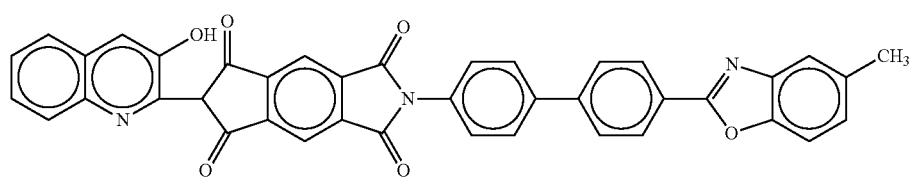

(5)

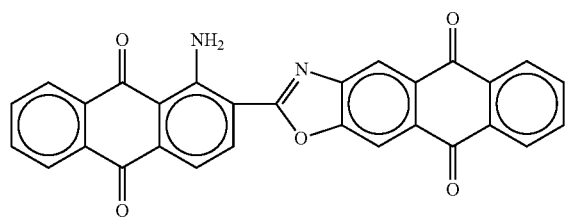

(6)

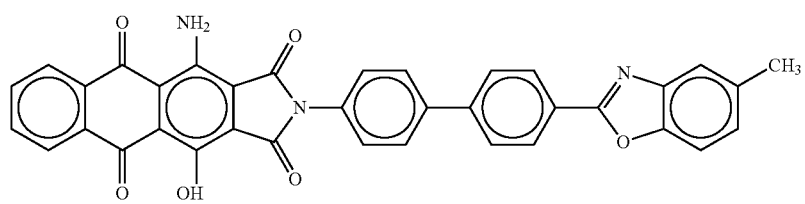

(7)

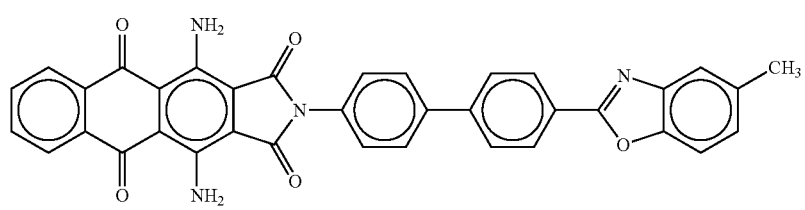

(8)

-continued

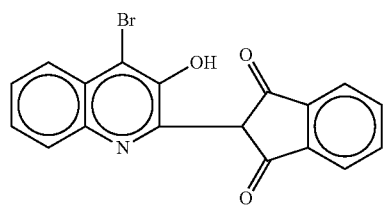 (9)

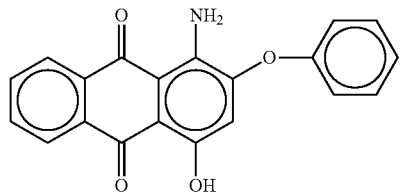 (10)

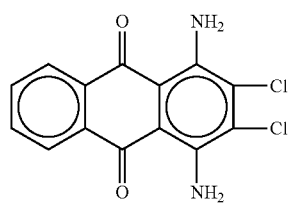 (11)

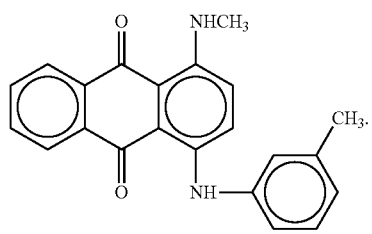 (12)

26. A polarized film comprising a resin, a dichroic dye and an organic coloring compound represented by the following general formula (1):

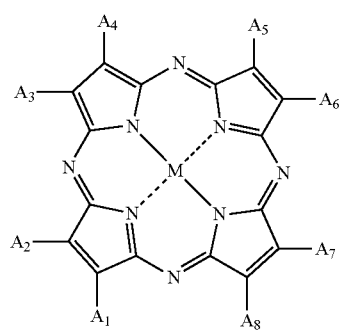 (1)

wherein $A_1$ to $A_8$ each independently represent a hydrogen atom, a halogen atom, a nitro group, a cyano group, a hydroxy group, an amino group, a carboxyl group, a sulfone group, a linear, branched, or cyclic alkyl group having 1 to 20 carbon atoms, an alkoxy group having 1 to 20 carbon atoms, an aryloxy group having 6 to 20 carbon atoms, a monoalkylamino group having 1 to 20 carbon atoms, a dialkylamino group having 2 to 20 carbon atoms, an aralkyl group having 7 to 20 carbon atoms, an aryl group having 6 to 20 carbon atoms, a heteroaryl group, an alkylthio group having 1 to 20 carbon atoms, or an arylthio group having 1 to 20 carbon atoms, or may form a ring other than an aromatic ring through a linking group, and M represents two hydrogen atoms, a divalent metal atom, a trivalent mono-substituted metal atom, a tetravalent di-substituted metal atom, or an oxy metal.

27. The polarized film according to claim 26, wherein the organic coloring compound is represented by the following general formula (1a):

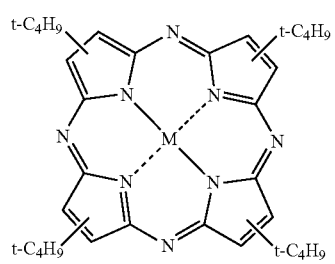 (1a)

wherein t-$C_4H_9$ represents a tertiary butyl group, four tertiary butyl groups correspond to $A_1$ or $A_2$, $A_3$ or $A_4$, $A_5$ or $A_6$, and $A_7$ or $A_8$, respectively, in the formula (1), and represent a position isomer structure, four groups that are not tertiary butyl groups in $A_1$ to $A_8$ represent a hydrogen atom; M represents a divalent copper atom, a divalent palladium atom, or divalent vanadium oxide (—V(=O)—).

28. The polarized film according to claim 26, wherein the resin is a thermoplastic polyester.

29. The polarized film according to claim 28, wherein the thermoplastic polyester is a polyethylene terephthalate.

30. The polarized film according to claim 26, wherein the organic coloring compound is contained in the amount of 50 to 7000 ppm and the dichroic dye is contained in the amount of 0.005 parts by weight to 4 parts by weight with respect to 100 parts by weight of the resin in the polarized film.

31. A method for producing the polarized film according to claim 26, comprising:
producing a resin film containing the organic coloring compound and the dichroic dye; and
shaping the resin film.

32. The method for producing the polarized film according to claim 31, wherein the resin film is a thermoplastic polyester film.

33. The method for producing the polarized film according to claim 32, wherein shaping the resin film includes:
shaping the thermoplastic polyester film under the temperature condition of from the glass transition temperature of the thermoplastic polyester+20° C. to the glass transition temperature+120° C.

34. The method for producing the polarized film according to claim 31, wherein the dichroic dye is represented by the following formulae (5) to (12):
(5)
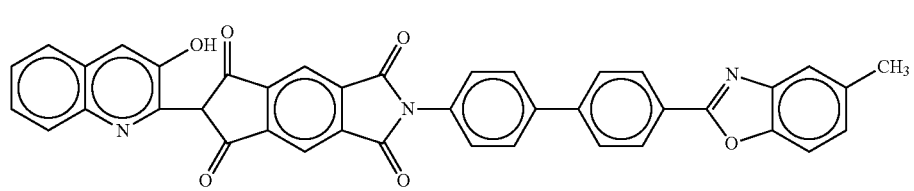
(6)
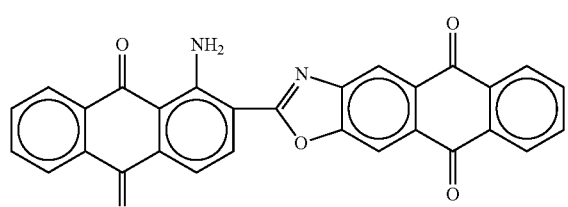
(7)
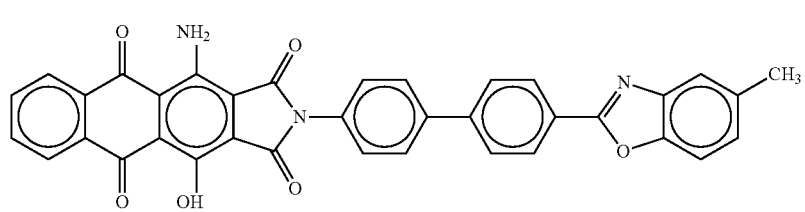
(8)
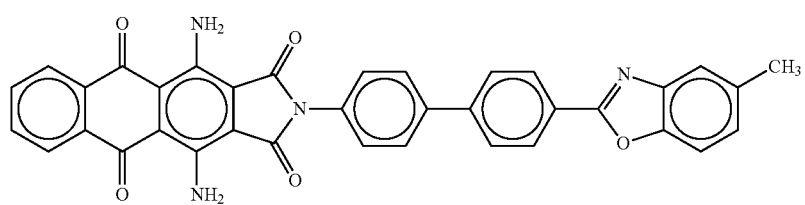
(9)
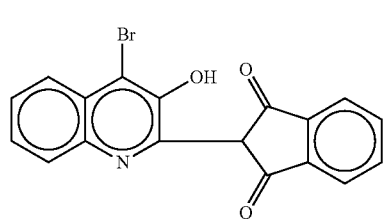
(10)
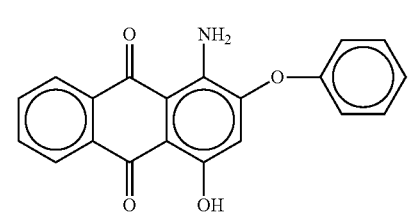
(11)
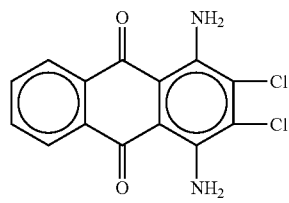
(12)
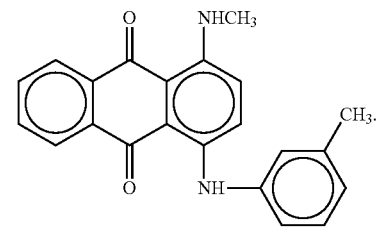
35. The plastic polarized lens according to claim 1, wherein the dichroic dye is represented by the following formulae (5) to (12):
(5)
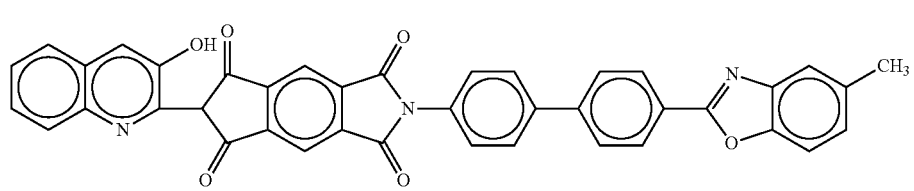

-continued
(6)
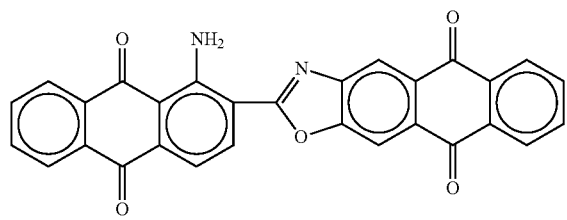
(7)
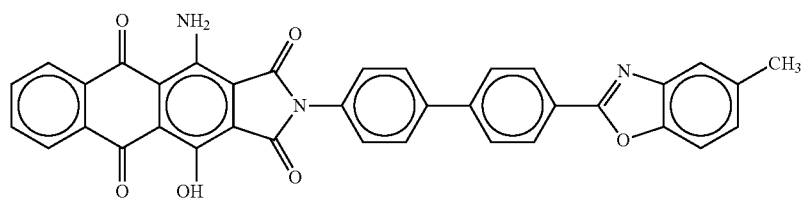
(8)
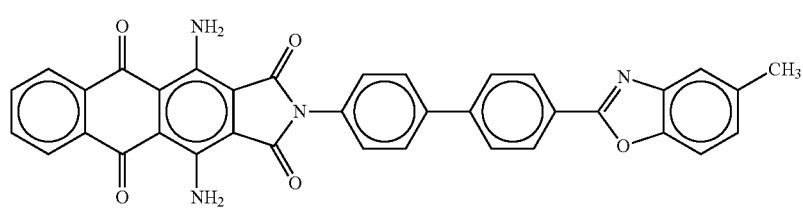
(9)
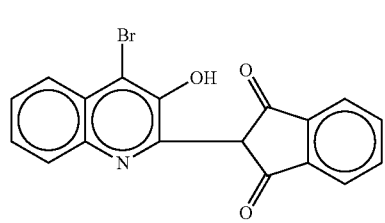
(10)
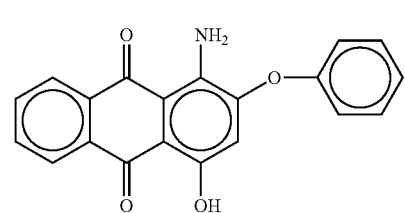
(11)
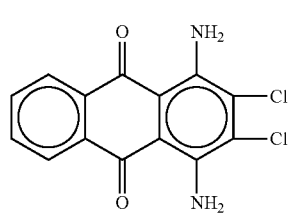
(12)
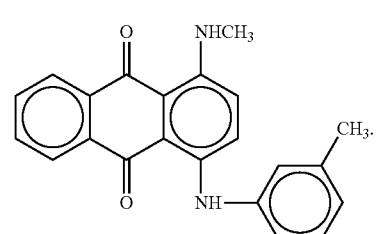
36. The polarized film according to claim 26, wherein the dichroic dye is represented by the following formulae (5) to (12):
(5)
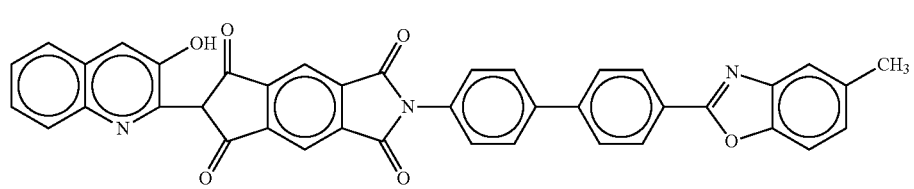

-continued
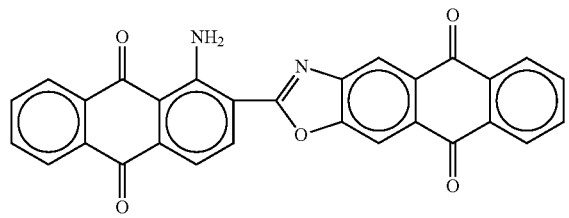
(6)
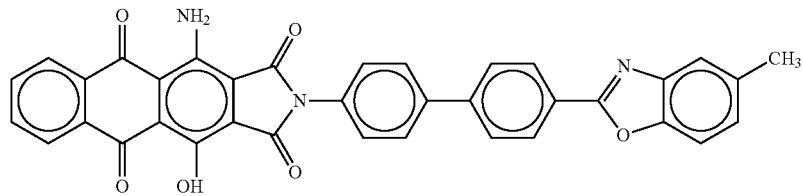
(7)
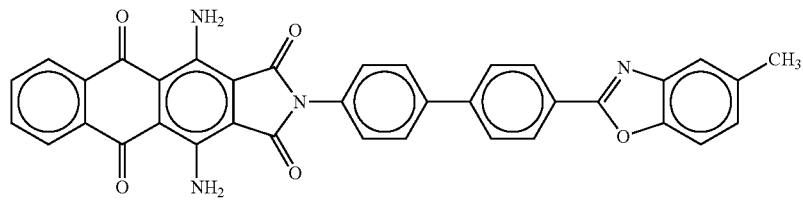
(8)
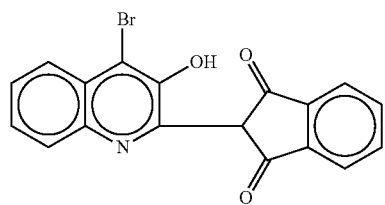
(9)
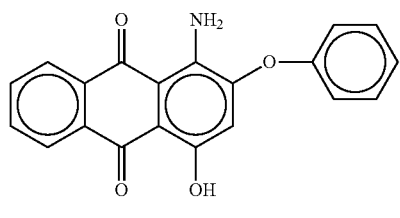
(10)
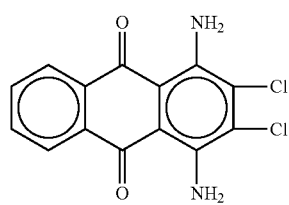
(11)
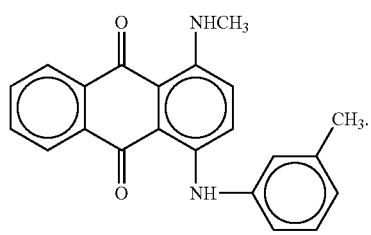
(12)
37. The plastic polarized lens according to claim 1, wherein at least one surface of the polarized film is surface modified.
* * * * *